(12) United States Patent
Negishi et al.

(10) Patent No.: US 8,314,850 B2
(45) Date of Patent: Nov. 20, 2012

(54) IMAGE SENSING APPARATUS AND METHOD FOR CONTROLLING THE SAME

(75) Inventors: Norio Negishi, Saitama (JP); Takeshi Suwa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 377 days.

(21) Appl. No.: 11/722,464

(22) PCT Filed: Apr. 20, 2007

(86) PCT No.: PCT/JP2007/005129
§ 371 (c)(1),
(2), (4) Date: Jun. 21, 2007

(87) PCT Pub. No.: WO2007/126033
PCT Pub. Date: Nov. 8, 2007

(65) Prior Publication Data
US 2010/0026835 A1    Feb. 4, 2010

(30) Foreign Application Priority Data

Apr. 25, 2006 (JP) ................................. 2006-121271
Jun. 13, 2006 (JP) ................................. 2006-164067

(51) Int. Cl.
*H04N 9/73* (2006.01)

(52) U.S. Cl. ............. 348/223.1; 348/240.2; 348/240.99; 348/296

(58) Field of Classification Search ................ 348/223.1, 348/240.1, 240.2, 240.99, 294–324
See application file for complete search history.

(56) References Cited

U.S. PATENT DOCUMENTS

| | | | |
|---|---|---|---|
| 2004/0130632 A1* | 7/2004 | Shiraishi | 348/223.1 |
| 2006/0170997 A1* | 8/2006 | Takahashi | 358/518 |
| 2006/0244841 A1* | 11/2006 | Ikeda | 348/222.1 |
| 2006/0290792 A1* | 12/2006 | Nikkanen et al. | 348/240.2 |
| 2006/0290796 A1* | 12/2006 | Nikkanen et al. | 348/294 |
| 2007/0229680 A1* | 10/2007 | Kinney | 348/240.2 |

FOREIGN PATENT DOCUMENTS

| | | |
|---|---|---|
| JP | 2003-143611 | 5/2003 |
| JP | 2003-244723 | 8/2003 |
| JP | 3513506 | 1/2004 |
| JP | 2004-040432 | 2/2004 |
| JP | 2004-064676 | 2/2004 |
| JP | 2007-043248 | 2/2007 |

\* cited by examiner

*Primary Examiner* — Sinh Tran
*Assistant Examiner* — Christopher K Peterson
(74) *Attorney, Agent, or Firm* — Cowan, Liebowitz & Latman, P.C.

(57) ABSTRACT

Using correction values obtained based on image signals outputted from an image sensing unit by controlling the image sensing unit in the first mode, in which image signals are read out from a first photoelectric conversion element group arranged in a first region of an image sensing plane, the image signals outputted from an image sensing apparatus by controlling the image sensing unit in the second mode, in which image signals are read out from a second photoelectric conversion element group arranged in a second region that is smaller than the first region of the image sensing plane, are subjected to a white balance process.

7 Claims, 28 Drawing Sheets

FIG. 6A
FIG. 6B
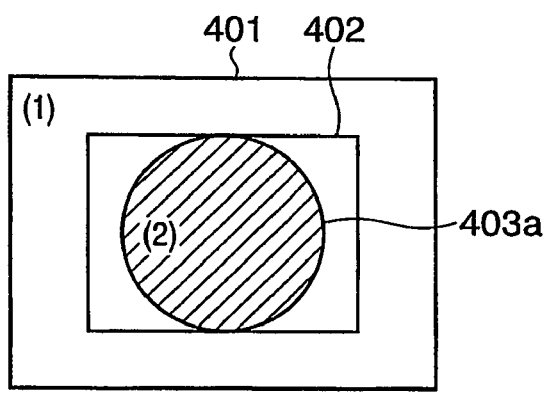
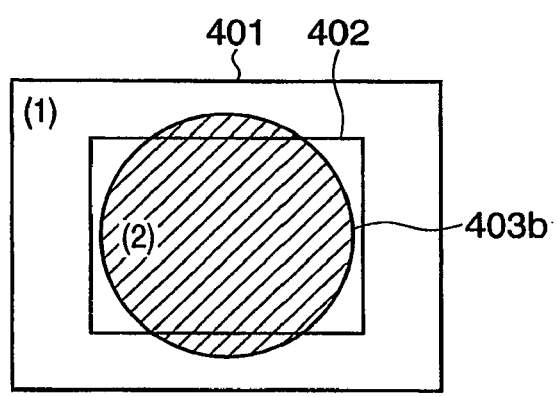

F I G. 12
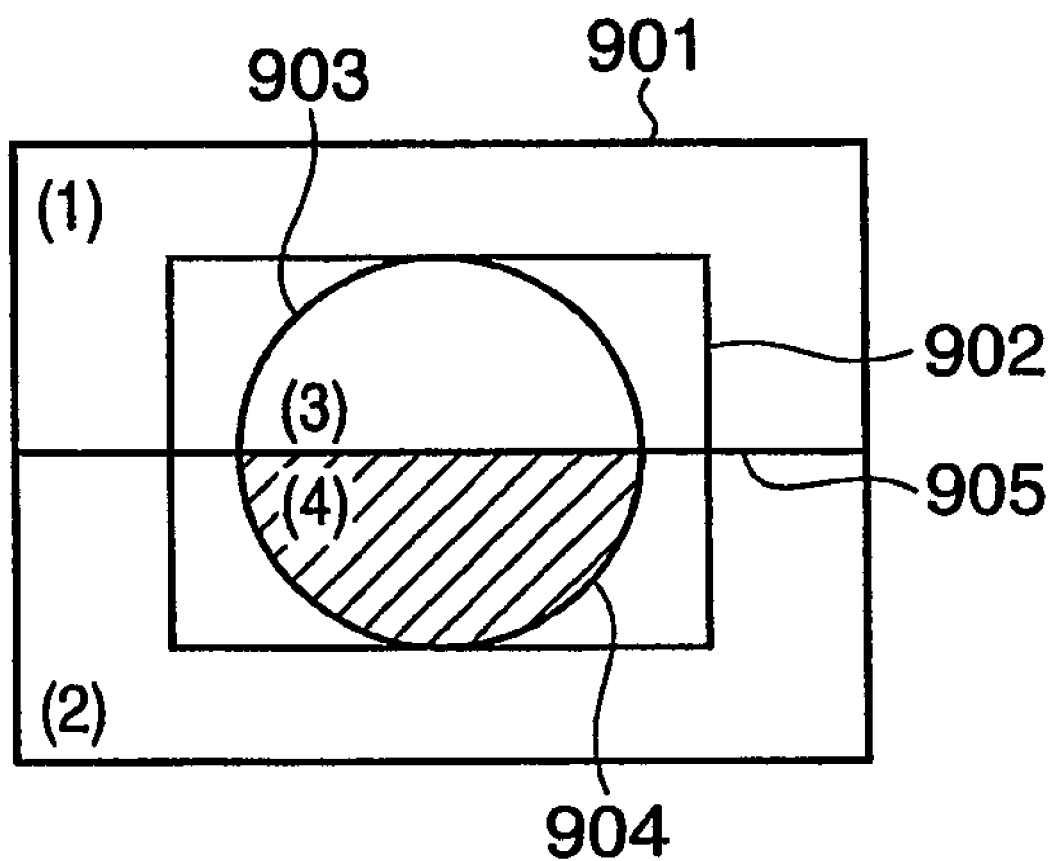

FIG. 18

|  | First Column | Second Column | Third Column | Fourth Column |
|---|---|---|---|---|
| Eleventh Row | | | | |
| Tenth Row | G | B | G | B |
| Ninth Row | R | G | R | G |
| Eighth Row | G | B | G | B |
| Seventh Row | R | G | R | G |
| Sixth Row | G | B | G | B |
| Fifth Row | R | G | R | G |
| Fourth Row | G | B | G | B |
| Third Row | R | G | R | G |
| Second Row | G | B | G | B |
| First Row | R | G | R | G |

FIG. 21A

| R | G1 | | | R | G1 |
|---|----|--|--|---|----|
| G2 | B | | | G2 | B |
| R | G1 | | | R | G1 |
| G2 | B | | | G2 | B |

| R | G1 | | | R | G1 |
|---|----|--|--|---|----|
| G2 | B | | | G2 | B |

FIG. 21B

| R | G1 |
|---|----|
| G2 | B |

ONE BLOCK

IMAGE SENSING APPARATUS AND METHOD FOR CONTROLLING THE SAME

CROSS-REFERENCE TO RELATED APPLICATIONS

This application is a continuation of International Application No. PCT/JP2007/059129, filed Apr. 20, 2007, the entire disclosure of which is hereby incorporated by reference.

TECHNICAL FIELD

The present invention relates to an image sensing apparatus having photoelectric conversion elements and a method for controlling the same, and more particularly to an image sensing apparatus using a CMOS image sensor and a method for controlling the same.

BACKGROUND ART

CCD image sensors and CMOS image sensors have been widely used as solid-state image sensing elements. In CCD image sensors, light is converted to signal charges by photoelectric conversion elements arranged in pixels, and the signal charges are read out from all the pixels simultaneously and transferred to CCD. The transferred signal charges are converted to electrical signals and then outputted. On the other hand, in CMOS image sensors, light is converted to signal charges by photoelectric conversion elements arranged in pixels, the signal charges are amplified and converted to electrical signals by each pixel and then outputted. CMOS image sensors have the unique feature of being capable of reading out a part of the pixel region of an image sensing unit (hereinafter referred to as "partial readout"). CCD image sensors, which read out the image signals of the entire pixel region at a time, do not have this feature.

FIG. 25 is a schematic diagram illustrating an electronic zoom utilizing partial readout which is a feature of CMOS image sensors (hereinafter referred to as "electronic zoom"). Reference numeral 1301 denotes an effective pixel region of a CMOS image sensor in which a×b pixels are arranged. In this case, the electronic zoom magnification is one (×1). Reference numeral 1302 denotes a pixel region that is read out at an electronic zoom magnification of 2 (×2), at which (a/2)×(b/2) pixels are read out. Reference numeral 1303 denotes a pixel region that is read out at an electronic zoom magnification of 3 (×3), at which (a/3)×(b/3) pixels are read out. The image signal outputted from the CMOS image sensor and converted to a digital signal by an A/D converter (not shown) is divided into a plurality of blocks arranged according to the Bayer arrangement, each block of which consists of a repetition of R, G, G and B, as shown in FIG. 26. Color evaluation values Cx, Cy and Y are calculated for each block using Equations (1) below.

$$Cx = (R-B)/Y$$

$$Cy = (R+B-2G)/Y$$

$$Y = (R+G+B)/2 \qquad \text{Equations (1)}$$

The color evaluation values Cx and Cy for each block calculated using Equations (1) are compared with a preset white detection region.

FIG. 27 is a graph illustrating the white detection region. A white detection region 101 is determined as follows. First, a white object such as a white reference panel (not shown) is captured using light sources having different color temperatures ranging from high to low at a given color temperature interval. The color evaluation values Cx and Cy are then calculated from Equations (1) using the signal values obtained from the image sensing unit. The color evaluation values Cx and Cy obtained from a light source are plotted on the horizontal axis and the vertical axis, respectively (i.e., Cx on the horizontal axis and Cy on the vertical axis). The plotted points are connected by straight lines, or approximated using a plurality of straight lines. Thereby, a white detection axis 102 that extends from a high color temperature to a low color temperature is formed. For the same white, there may be slight spectral differences, so that the white detection axis 102 is allowed to have some width along the direction of the Y axis. This region is defined as a white detection region 101.

If the calculated color evaluation values Cx and Cy fall within the white detection region 101, that block is assumed to be white. For each block having been assumed to be white, the integral values (SumR, SumG and SumB) of the color pixels of the block are calculated. Using the calculated integral values and Equations (2) given below, white balance gains (kWB_R, kWB_G and kWB_B) for the colors R, G and B, respectively, are calculated (see Japanese Patent No. 03513506 and Japanese Patent Laid-Open No. 2003-244723).

$$kWB\_R = 1.0/\text{Sum}R$$

$$kWB\_G = 1.0/\text{Sum}G$$

$$kWB\_B = 1.0/\text{Sum}B \qquad \text{Equations (2)}$$

However, the conventional white balance adjustment for CMOS image sensors suffered the following problem. For example, the color evaluation values of a white object under sunlight are distributed as indicated by a region 103 shown in FIG. 27. If a human face is captured in a close-up manner under a light source having a high color temperature (e.g., sunlight) using an electronic zoom utilizing the partial readout when a moving image mode or EVF mode is set, the color evaluation values of the human complexion are distributed as indicated by a region 105. The region 105 almost agrees with a region 104 where the color evaluation values of a white captured under a light source having a low color temperature (e.g., a white tungsten light source) are distributed. For this reason, when the skin color accounts for a large proportion, as in the case where a human face is captured in a close-up manner, the skin color is sometimes judged erroneously to be the one captured under a light source having a color temperature lower than the actual color temperature.

DISCLOSURE OF INVENTION

The present invention has been made to address the problem encountered when an image is generated by partially reading out a pixel region of an image sensing unit. An object of the present invention is to provide an appropriate white balance processing even in the above case.

A first aspect of the present invention is an image sensing apparatus comprises an image sensing unit in which a plurality of photoelectric conversion elements are arranged on a image sensing plane, and a control unit, wherein the control unit has a first mode in which image signals are read out from a first photoelectric conversion element group arranged in a first region of the image sensing plane, and a second mode in which image signals are read out from a second photoelectric conversion element group arranged in a second region that is smaller than the first region of the image sensing plane, and using correction values obtained based on the image signals outputted from the image sensing unit in the first mode by controlling the image sensing unit, the image signals outputted from the image sensing apparatus are processed for white balance in the second mode by controlling the image sensing unit.

A second aspect of the present invention is an image sensing apparatus comprises an image sensing unit in which a plurality of photoelectric conversion elements are arranged on a image sensing plane, and a control unit, wherein the control unit has a first mode in which image signals are read out from a first photoelectric conversion element group arranged in a first region of the image sensing plane on a divided region unit basis, the divided region formed by dividing the first region into a plurality of regions, and a second mode in which image signals are read out from a second photoelectric conversion element group arranged in a second region that is smaller than the first region of the image sensing plane, the readout of the signal images of the divided regions is performed in the first mode between the readouts of signal images in the second mode and in subsequent the second mode, correction values are calculated based on the image signals of the divided regions read out in the first mode, and the image signals read out in the second mode are processed for white balance.

A third aspect of the present invention is a method for controlling an image sensing apparatus has a first mode in which image signals are read out from a first photoelectric conversion element group arranged in a first region of a image sensing plane, and a second mode in which image signals are read out from a second photoelectric conversion element group arranged in a second region that is smaller than the first region of the image sensing plane, the method comprising steps of performing a white balance processing of the image signals outputted from an image sensing unit in the second mode by controlling the image sensing unit using correction values obtained based on the image signals outputted from an image sensing unit in the first mode by controlling the image sensing unit, and generating an image based on the second photoelectric conversion element group arranged in the second region.

A fourth aspect of the present invention is a method for controlling an image sensing apparatus comprises an image sensing unit in which a plurality of photoelectric conversion elements are arranged on a image sensing plane, and a control unit that controls the image sensing unit, wherein the control unit has a first mode in which image signals are read out from a first photoelectric conversion element group arranged in a first region of the image sensing plane on a divided region unit basis, the divided region formed by dividing the first region into a plurality of regions, and a second mode in which image signals are read out from a second photoelectric conversion element group arranged in a second region that is smaller than the first region of the image sensing plane, the readout of the signal images of the divided regions is performed in the first mode between the readouts of signal images in the second mode and in subsequent the second mode, the method comprising steps of calculating correction values based on at least the image signals read out in the first mode, and performing a white balance processing of the image signals read out in the second mode based on the correction values.

Further features of the present invention will become apparent from the following description of exemplary embodiments with reference to the attached drawings.

BRIEF DESCRIPTION OF DRAWINGS

FIGS. 6A and 6B are diagrams showing divisions of an image sensing screen according to a first preferred embodiment of the present invention.

FIG. 12 is a diagram showing a division of a screen according to a third preferred embodiment of the present invention.

FIG. 18 is a diagram showing a color filter for use in an image sensing apparatus according to a fifth preferred embodiment of the present invention.

FIGS. 21A and 21B are diagrams showing an example of color temperature detection blocks according to a fifth preferred embodiment of the present invention.

BEST MODE FOR CARRYING OUT THE INVENTION

Figure 1:
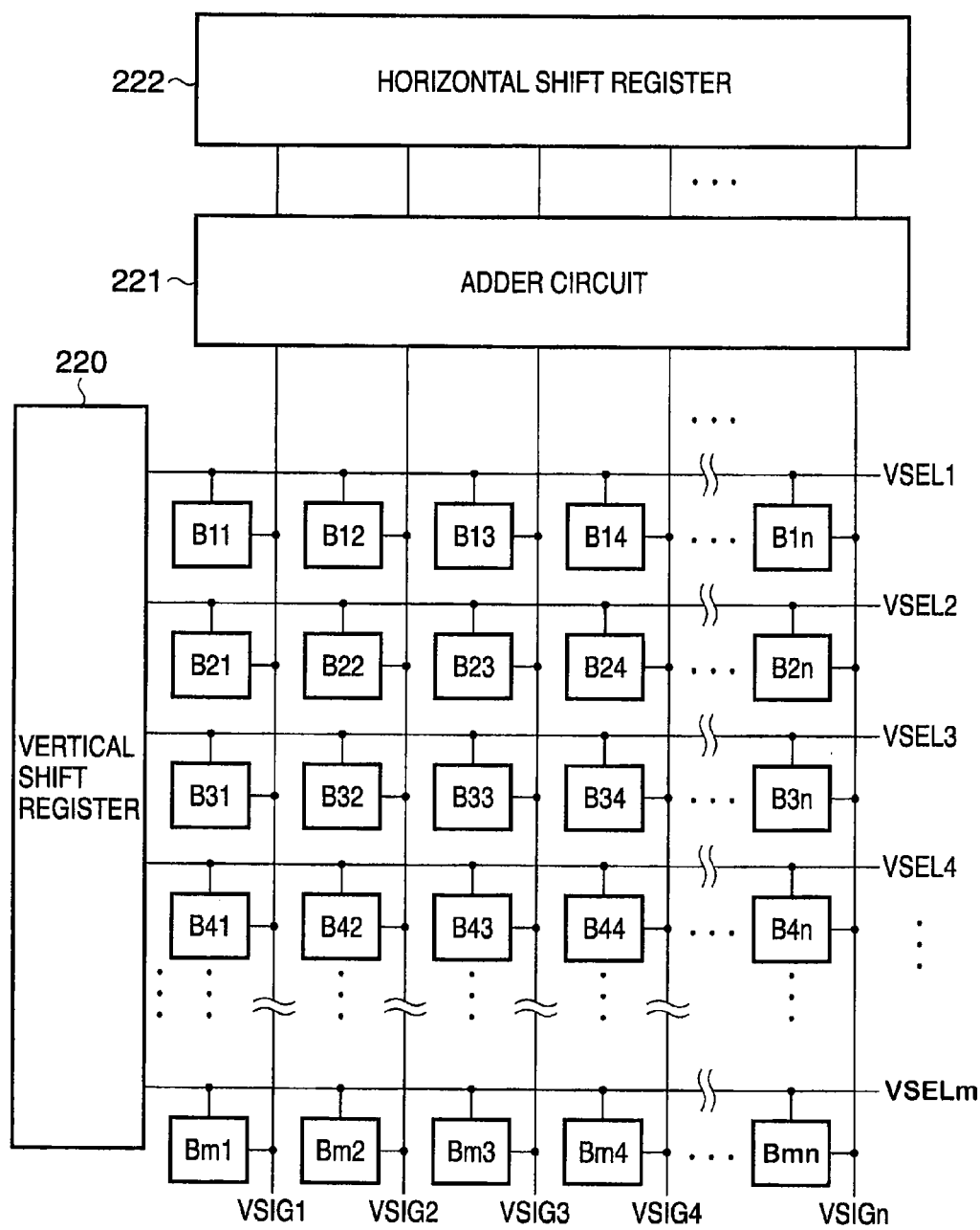
FIG. 1 is an overall diagram of an image sensing unit using a CMOS image sensor.

Hereinafter, preferred embodiments of the present invention will be described in detail with reference to the accompanying drawings. FIG. 1 is an overall diagram of an image sensing unit using a CMOS image sensor. Pixels B11 to Bmn (where m and n are integers, the same applies hereinafter) are arranged two-dimensionally on a image sensing plane. Each pixel includes at least a photoelectric conversion element and a transistor that amplifies and outputs signal charges converted by the photoelectric conversion element for each pixel. A vertical shift register 220 outputs control pulses for reading out electrical signals from the pixels of individual horizontal output lines VSEL1 to VSELm. The electrical signals of the pixels selected by the horizontal output lines VSEL1 to VSELm are read out by vertical output lines VSIG1 to VSIGn, and are then stored in an adding circuit 221. The electrical signals stored in the adding circuit 221 are sequentially read out by scanning by a horizontal shift register 222 and then outputted in time sequence.

When a partial readout is performed as described above, the vertical shift register 220 outputs control pulses to those of the horizontal output lines VSEL1 to VSELm that are connected to the pixels that are to be read out. The horizontal shift register 222 outputs control pulses to those of the vertical output lines VSIG1 to VSIGn that are connected to the pixels that are to be read out. The electrical signals of the pixels selected by the control pulses of the horizontal output lines are read out to the adding circuit 221 by the control pulses of the vertical output lines, and the electrical signals pass through the adding circuit 221 without being stored in the adding circuit 221. For example, when pixels are read out at an electronic zoom magnification of 2 (×2), two horizontal pixels are not added (and neither are two vertical pixels added when an adding circuit is arranged in the vertical shift register). On the other hand, when the pixels of an entire effective pixel region of an image sensing unit 200, which will be described later with reference to FIG. 2, are read out (i.e., at an electronic zoom magnification of 1 (×1)), n horizontal pixels are added (and m vertical pixel are added when an adding circuit is arranged in the vertical shift register).

Figure 2:
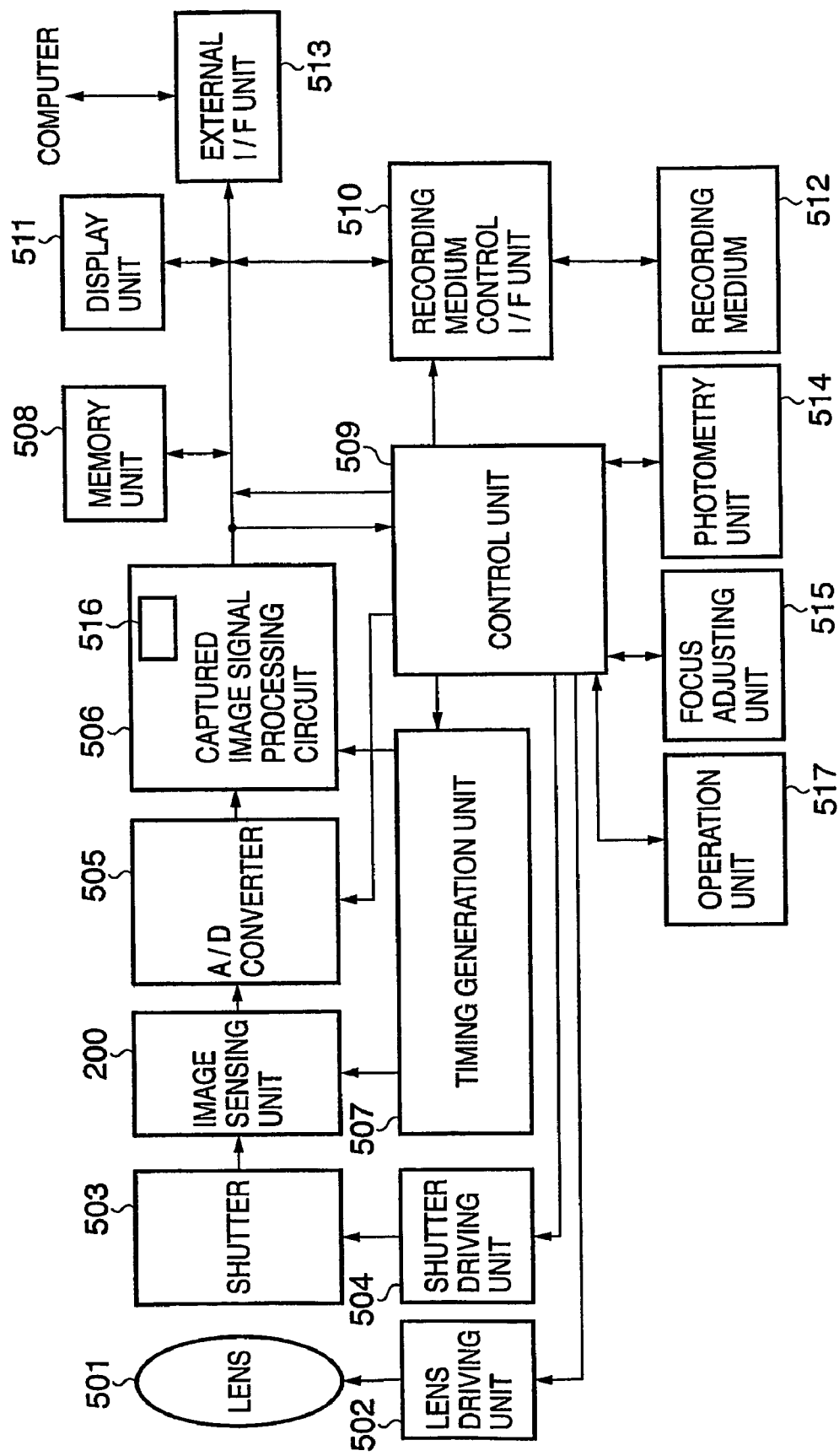
FIG. 2 is a schematic diagram of an image sensing system according to a preferred embodiment of the present invention.

FIG. 2 is a schematic diagram of an image sensing system using an image sensing unit as shown in FIG. 1. Reference numeral 501 denotes a lens unit serving as an optical system (simply referred to as "lens" in FIG. 2), 502 denotes a lens driving unit, 503 denotes a mechanical shutter (simply referred to as "shutter"), 504 denotes a mechanical shutter driving unit (simply referred to as "shutter driving unit" in FIG. 2), 505 denotes an A/D converter, and 200 denotes an image sensing unit 200 configured as shown in FIG. 1. Reference numeral 506 denotes a captured image signal processing circuit, 507 denotes a timing generation unit, 508 denotes a memory unit, 509 denotes a control unit, 510 denotes a recording medium control interface unit (simply referred to as "recording medium control I/F unit" in FIG. 2), and 511 denotes a display unit. Reference numeral 512 denotes a recording medium, 513 denotes an external interface unit (simply referred to as "external I/F unit" in FIG. 2), 514 denotes a photometry unit, and 515 denotes a focus adjusting unit. The captured image signal processing circuit 506 includes a WB circuit 516 that performs white balance processing based on the signals from the A/D converter 505. The process in the WB circuit 516 will be described later in detail with reference to FIG. 3.

An object image passing through the lens 501 is formed near the image sensing unit 200. The object image formed near the image sensing unit 200 is captured by the image sensing unit 200 in the form of an image signal. The image signals outputted from the image sensing unit 200 are amplified and converted from analog to digital signals (A/D conversion). After the A/D conversion, the captured image signal processing circuit 506 obtains R, G, G, B signals, and performs various adjustments, image data compression, etc.

The lens 501 is driven and controlled (zoom, focus, iris) by the lens driving unit 502. The shutter 503 is a shutter mechanism having only a screen corresponding to the rear screen of a focal plane shutter for use in single lens reflex cameras. The shutter 503 is driven and controlled by the shutter driving unit 504. The timing generation unit 507 outputs various timing signals to the image sensing unit 200 and to the captured image signal processing circuit 506. The control unit 509 performs controls of the entire image sensing system and various computations. The memory unit 508 stores image data temporarily. The recording medium control I/F unit 510 controls the recording medium 512 to record image data or reads image data from the recording medium 512. The display unit 511 shows image data thereon. The recording medium 512 is a removable storage medium such as a semiconductor memory, and records image data. The external I/F unit 513 is an interface for communicating with an external computer or the like. The photometry unit 514 detects information on brightness of an object. The focus adjusting unit 515 detects the distance to the object. Reference numeral 516 denotes the white balance circuit (WB circuit). The operation mode of the image sensing apparatus (an auto mode, a portrait mode for capturing people, a landscape mode for capturing landscapes, a manual mode in which a white balance correction value is set by the user) is set by an operation unit 517.

First Embodiment

Figure 3:
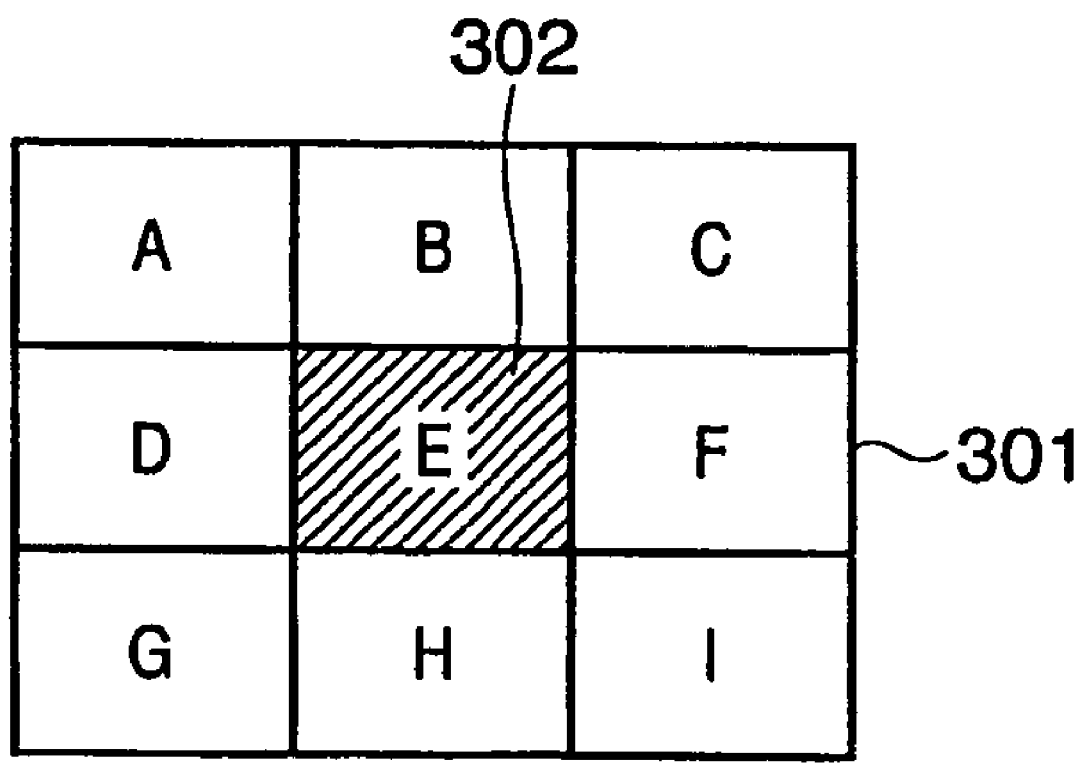
FIG. 3 is a diagram schematically showing a signal readout method according to a first preferred embodiment of the present invention.

FIG. 3 is a diagram schematically showing a method of electronic zooming by partial readout with an image sensing apparatus according to a first preferred embodiment of the present invention. An outer pixel region 301 is an effective pixel region of an image sensing unit 200. An inner pixel region 302 is a pixel region that is partially read out by an electronic zoom. The regions A to I are pixel regions that are read out in the intervals between the readouts of frames for recording moving images or displaying when an electronic zoom is set and are divided regions obtained by dividing the pixel region other than the pixel region E, partially read out with the electronic zoom, into a plurality of regions. The controls according to this embodiment are performed by the control unit 509.

In order to increase the accuracy of white balance processing in the WB circuit 516 shown in FIG. 2, it is necessary to enlarge a pixel region (angle of view) for obtaining white balance coefficients. For this reason, the pixel regions for obtaining white balance coefficients are read out between every predetermined number of frames for recording moving images or displaying (region E). For example, when capturing moving images, the pixel region E and each of the divided regions are alternately read out from the image sensing unit 200 as follows: E→A→E→B→E→C→E→D→E→F→E→G→E→H→E→I. Alternatively, for example, a divided region may be read out every time the pixel region E is read out M times (where M is an integer equal to or greater than 2)(hereinafter referred to as "E (M readouts)"). More specifically, the readout may be performed as follows: E (M readouts)→A→E (M readouts) →B→E (M readouts)→C→E (M readouts)→D→E (M readouts)→F→E (M readouts)→G→E (M readouts)→H→E (M readouts)→I. The pixel regions for obtaining white balance coefficients may or may not include the pixel region E. The electrical signals of the pixel regions (divided regions) for obtaining white balance coefficients are stored temporarily in the recording medium 512 until the electrical signals of the entire pixel region 301 (i.e., the electrical signals of a single image) are accumulated. When the electrical signals of the entire pixel region 301 are accumulated in the recording medium 512, the white balance coefficients are calculated.

Although the outer pixel region 301 is divided into nine regions in FIG. 3, the number is not limited thereto. Also, the readout order of the divided regions is not limited to that described above, and the readout can be performed in any other order. Also, the readouts of the divided regions does not need to be performed until the size of the pixel region E equals the total size of the read-out divided regions, and it is sufficient that the electrical signals are collected until the total size of the read-out divided regions exceeds that of the pixel region E. Even in such a case, it is possible to enhance the accuracy of white balance when a moving image mode or EVF mode is set.

The divided regions that are read out in the intervals between the pixel regions can also be read out by thinning out. Thinning readout can be performed by reducing the number of pixels B11 to Bmn selected by the horizontal shift register 222 and the vertical shift register 220. Some of the signals read out from the pixels B11 to Bmn of FIG. 1 may be added in the adding circuit 221. In this case also, the number of signals that are read out from the horizontal shift register 222 can be reduced. In this thinning readout, similarly to the above, when the electrical signals of predetermined pixel regions (typically, the entire pixel region 301) are accumulated in the recording medium 512, white balance coefficients serving as correction values are calculated. The "image" used hereinafter refers to an image for an entire angle of view including the divided regions obtained in the above-described manner.

Figure 4:
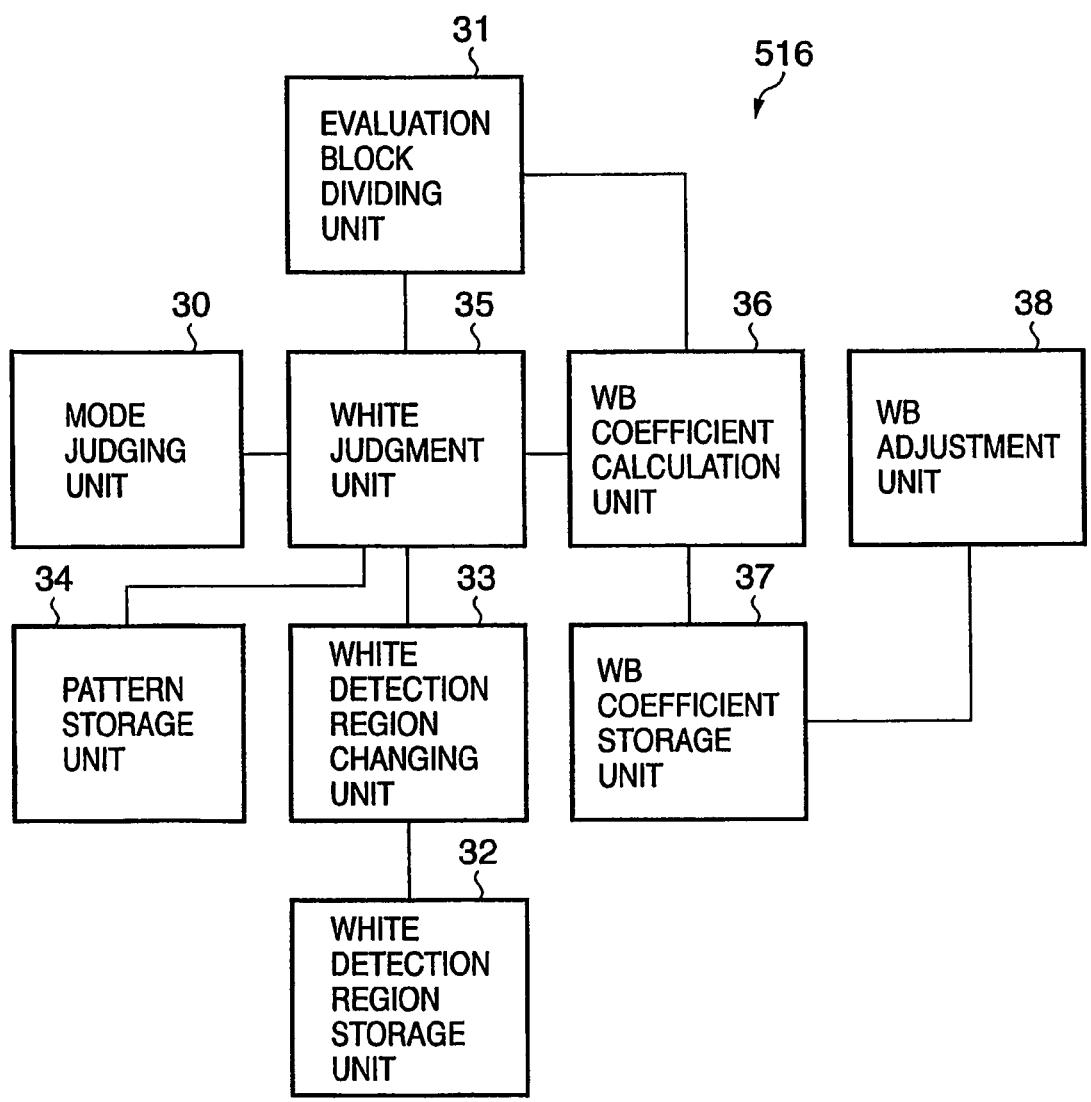
FIG. 4 is a block diagram showing a schematic configuration of a WB circuit according to a first preferred embodiment of the present invention.
Figure 26:
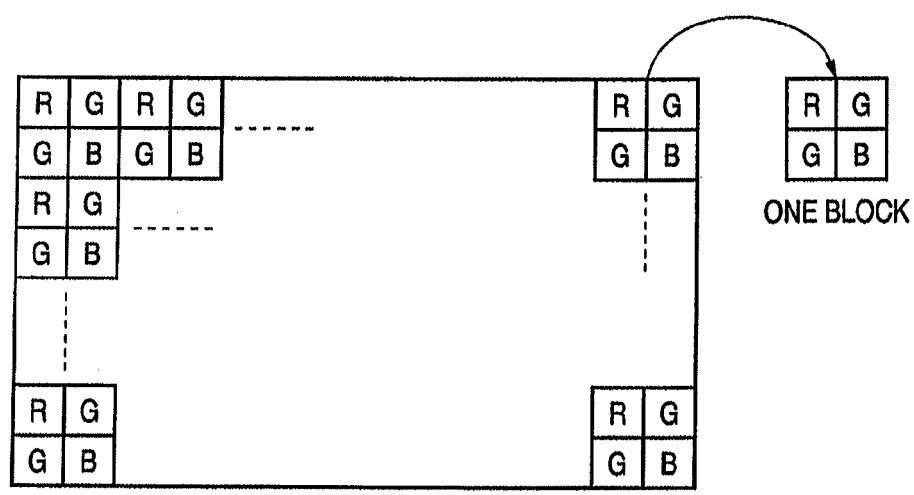
FIG. 26 is a diagram showing an example of a division of an image sensing screen indicating the units used in a white judgment processing.
Figure 27:
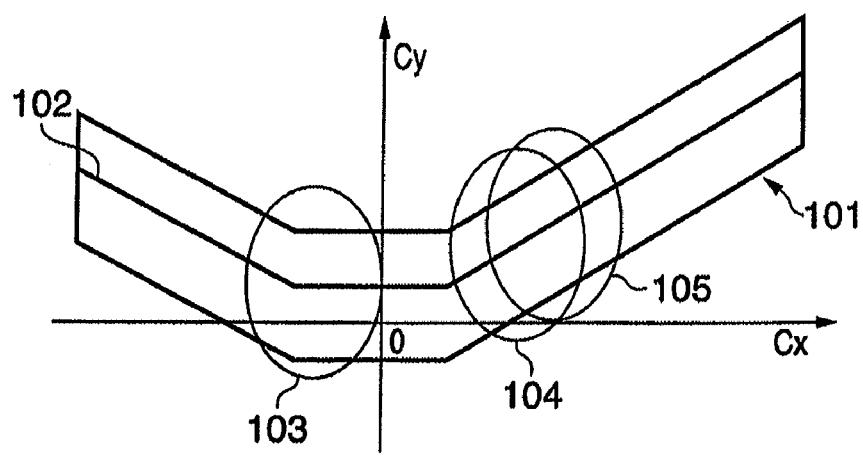
FIG. 27 is a graph showing a white detection region.

FIG. 4 is a block diagram showing a schematic configuration of the WB circuit 516 according to a first preferred embodiment of the present invention. Reference numeral 30 denotes a mode judging unit that determines the operation mode of the image sensing apparatus set by the operation unit 517, and 31 denotes an evaluation block dividing unit that divides an output signal from the image sensing unit 200 into a plurality of evaluation blocks as shown in FIG. 26. Reference numeral 32 denotes a white detection region storage unit that stores a white detection region(s) used as a reference (hereinafter referred to as a "reference white adjustment region(s)"), 33 denotes a white detection region changing unit that appropriately changes a white detection region using limit values, and 34 denotes a pattern storage unit that stores, by types of modes, combination patterns of a position on the image sensing screen and a white detection region that is changed by the white detection region changing unit and is used for white judgment of the evaluation blocks on that position. Reference numeral 35 denotes a white judgment unit that determines whether or not each of the evaluation blocks divided by the evaluation block dividing unit 31 is white, and 36 denotes a WB coefficient calculation unit that calculates white balance (WB) coefficients for use in WB adjustment based on the image signals of the evaluation blocks judged to be white by the white judgment unit 35. Reference numeral 37 denotes a WB coefficient storage unit that stores WB coefficients calculated by the WB coefficient calculation unit 36. Reference numeral 38 denotes a WB adjustment unit that adjusts output signals from the image sensing unit 200 for white balance using the WB coefficients stored in the WB coefficient storage unit 37. The white detection region storage unit 32, the pattern storage unit 34 and the WB coefficient storage unit 37 may be made up of a single memory or any number of memories.

A description is now given of the reference white detection regions stored in the white detection region storage unit 32. By way of example, a case is described in which a primary color filter is used as an image sensing unit 200.

Figure 5A:
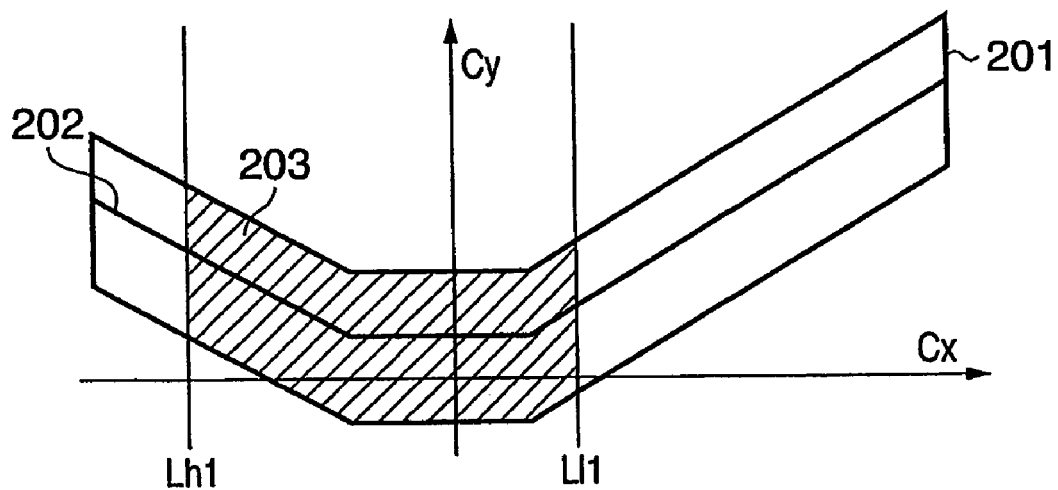
FIGS. 5A and 5B are graphs showing white detection regions according to a first preferred embodiment of the present invention.

In FIG. 5A, a first white detection region 201 and a white detection axis 202 are shown. As described previously, the color evaluation values Cx and Cy are obtained by first capturing a white object such as a white reference panel (not shown) using light sources having different color temperatures ranging from high to low at a given color temperature interval, and calculating the color evaluation values from Equations (1) given previously using the signal values obtained from the image sensing unit 200. Then, the color evaluation values Cx and Cy obtained from the various light sources are plotted on the horizontal axis and the vertical axis, respectively (i.e., Cx on the horizontal axis and Cy on the vertical axis). The plotted points are connected by straight lines, or approximated using a plurality of straight lines. Thereby, the white detection axis 202 that extends from a high color temperature to a low color temperature is obtained. The horizontal axis represents the color temperature of the light source, and the vertical axis represents the amount of adjustment in the green direction (i.e., a color-temperature direction of luminance and a color-temperature direction of fluorescent light). For the same white, there may be slight spectral differences, so that the white detection axis 202 is allowed to have some width along the direction of the Y axis. This region is defined as a first white detection region 201. The data of the white detection region 201 thus defined is stored in the white detection region storage unit 32 for example when the WB circuit 516 is produced or before shipment.

Figure 5B:
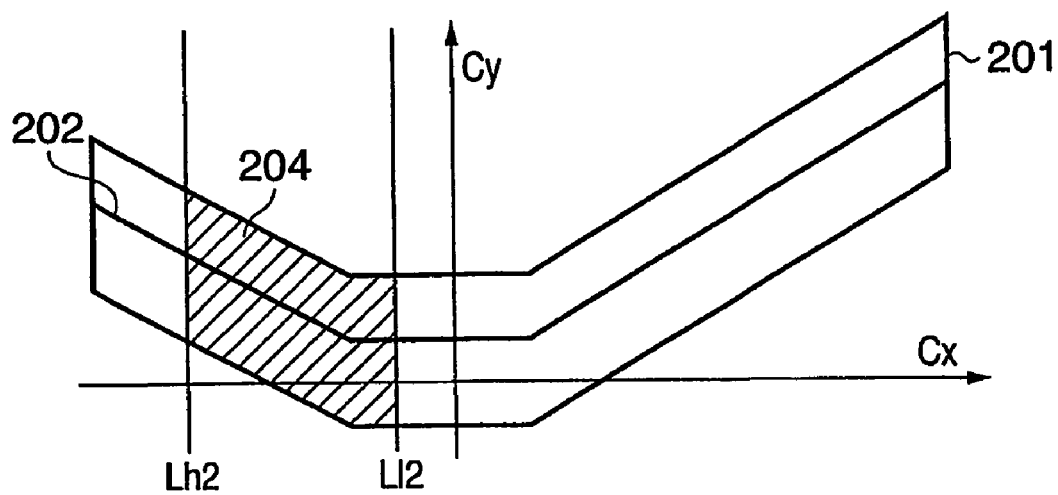

In FIG. 5A, a second white detection region 203 is formed by setting white detection limit values Ll1 and Lh1 in the first detection region 201 so as to limit the range of Cx to the range between Ll1 and Lh1. In FIG. 5B, a third white detection region 204 is formed by setting white detection limit values Ll2 and Lh2 in the first detection region 201 so as to remove a low color temperature region from the white detection region 203 to limit the range of Cx to the range between Ll2 and Lh2. The limit values Lh2 and Lh1 are set at the same value.

The white judgment unit 35 performs white judgment processing for each evaluation block. The WB coefficient calculation unit 36 calculates WB coefficients (white balance gains) from the integral values of the pixel values of the evaluation blocks determined to be white by the white judgment unit 35, and then stores the WB coefficients in the WB coefficient storage unit 37. The WB adjustment unit 38 performs a WB adjustment of an inputted image using the WB coefficients stored in the WB coefficient storage unit 37.

A description is now given of a white judgment processing with reference to FIGS. 5A, 5B, 6A, 6B and 7.

FIG. 6A shows an example of a pattern setting stored in the pattern storage unit 34 of FIG. 4 when an auto mode is set.

FIG. 6B shows an example of a pattern setting when a portrait mode is set. An outer rectangular region 401 is a maximum angle of view of an image sensing unit 200. An inner rectangular region 402 is a pixel region (angle of view) that is read out by the electronic zoom. A region (1) is a region obtained by excluding a circular region 403a or 403b from the rectangular region 401. A region (2) indicated by oblique lines corresponds to the circular region 403a or 403b. The dimension of the region (2) can be fixed according to the capture mode, or enlarged or reduced in response to a change in size of the angle of view by the electronic zoom. The pattern including the regions (1) and (2) indicates a combination of the position of each evaluation block and the size of a changed white detection region for use in white judgment of the evaluation block on that position. These patterns may be pre-stored in the pattern storage unit 34 when the WB circuit 516 is produced or before shipment, or the user may change the region setting.

Figure 7:
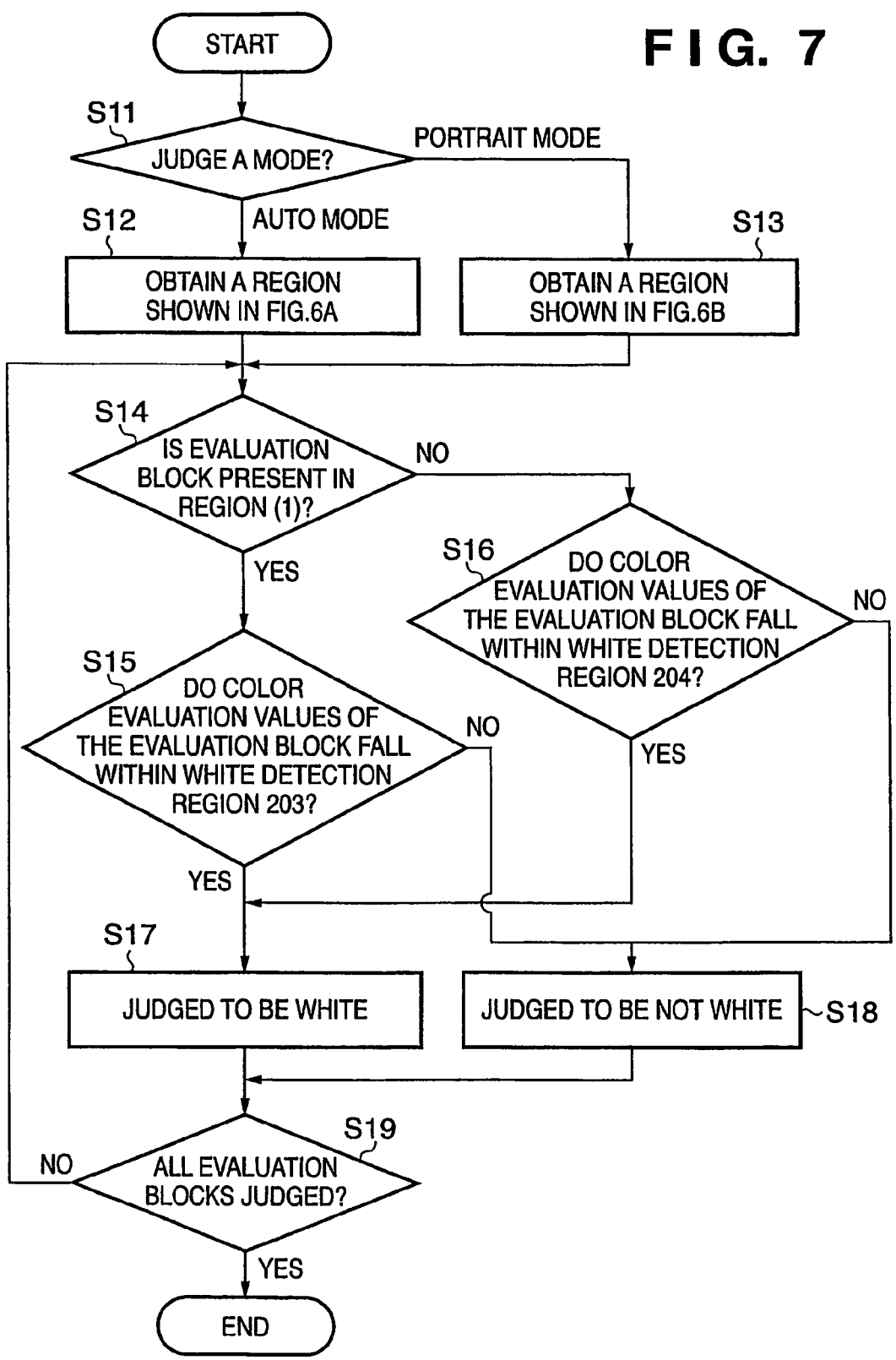
FIG. 7 is a diagram showing a flowchart illustrating white judgment processing according to a first preferred embodiment of the present invention.

A flowchart showing a sequence of a white judgment processing is shown in FIG. 7.

In step S11, the mode judging unit 30 determines which of the auto and portrait modes is set. When an auto mode is set, the process proceeds to step S12. When a portrait mode is set, the process proceeds to step S13.

In step S12, the white judgment unit 35 obtains the region data of a pattern as shown in FIG. 6A from the pattern storage unit 34.

In step S13, the white judgment unit 35 obtains the region data of a pattern as shown in FIG. 6B from the pattern storage unit 34.

In step S14, the white judgment unit 35 determines for each evaluation block whether it lies in the region (1) or the region (2). When an evaluation block lies in the region (1) ("YES" in step S14), the process proceeds to step S15. When the evaluation block lies in the region (2) ("No" in step S14), the process proceeds to step S16.

In step S15, the white judgment unit 35 compares the color evaluation values of the evaluation block with a second white detection region 203 as shown in FIG. 5A, which is limited by the white detection region changing unit 33.

In step S16, the white judgment unit 35 compares the color evaluation values of the evaluation block with a third white detection region 204 as shown in FIG. 5B, which is limited by the white detection region changing unit 33.

It is highly likely that a human face is contained in the center of the image sensing screen. For this reason, for the center of the image sensing screen, the limit on the low color temperature side is set to be higher than that of the peripheral region surrounding the center of the image sensing screen. In other words, the white detection region 204 is used so as to avoid the possibility that human skin is judged erroneously to be white.

In steps S15 and S16, when the white judgment unit 35 determines that the color evaluation values of an evaluation block fall within the second white detection region 203 or the third white detection region 204, the process proceeds to step S17. When the color evaluation values of an evaluation block do not fall within the second white detection region 203 or the third white detection region 204, the white judgment unit 35 proceeds to step S18.

In step S17, the white judgment unit 35 determines that the evaluation block whose color evaluation value has been determined to fall within the second white detection region 203 or the third white detection region 204 in step S15 or S16 is white.

In step S18, the white judgment unit 35 determines that the evaluation block whose color evaluation value has been determined not to fall within the second white detection region 203 or the third white detection region 204 in step S15 or S16 is not white.

For the evaluation blocks determined to be white by referring to the signals of an angle of view wider than those of the angle of view read out by the electronic zoom in the manner described above, the pixel values are integrated to obtain white balance gains (WB coefficients) as described previously.

In step S19, the white judgment unit 35 determines whether or not all the evaluation blocks are processed for white judgment, and repeats steps S14 to S18 until all the evaluation blocks are processed for white judgment.

According to experiments, excellent results were obtained when the white detection limit value Ll2 on the low color temperature side was fixed to about 5000 K. However, it is to be understood that the detection limit value Ll2 is not limited to 5000 K and can be changed as appropriate.

According to the first embodiment, the signals of a pixel region (angle of view) wider than the pixel region that is read out by an electronic zoom are read out, and different white detection regions are used depending on the position on the image sensing screen, whereby it is possible to reduce the possibility of erroneous white judgment. Consequently, a better white balance adjustment can be achieved.

When the capture mode of a camera is set to portrait mode, by enlarging the area of a center region (2) as shown in FIG. 6B, it is possible to further reduce the possibility of erroneous white judgment of human skin. However, when a portrait mode is set, it is highly likely that human skin is present in the center of the image sensing screen in the portrait mode, but when an auto mode is set, in many cases, human skin is not present in the center of the image sensing screen.

When human skin is not present in the center of the image sensing screen, the problem arises that the color temperature of an image captured under a light source is determined to be higher than the actual color temperature of the light source. This is because, according to the image sensing screen settings and white limit settings as described above, the detected color temperature of the center of the image sensing screen do not fall below the white detection limit value L12 on the low color temperature side (e.g., 5000 K).

Figure 8:
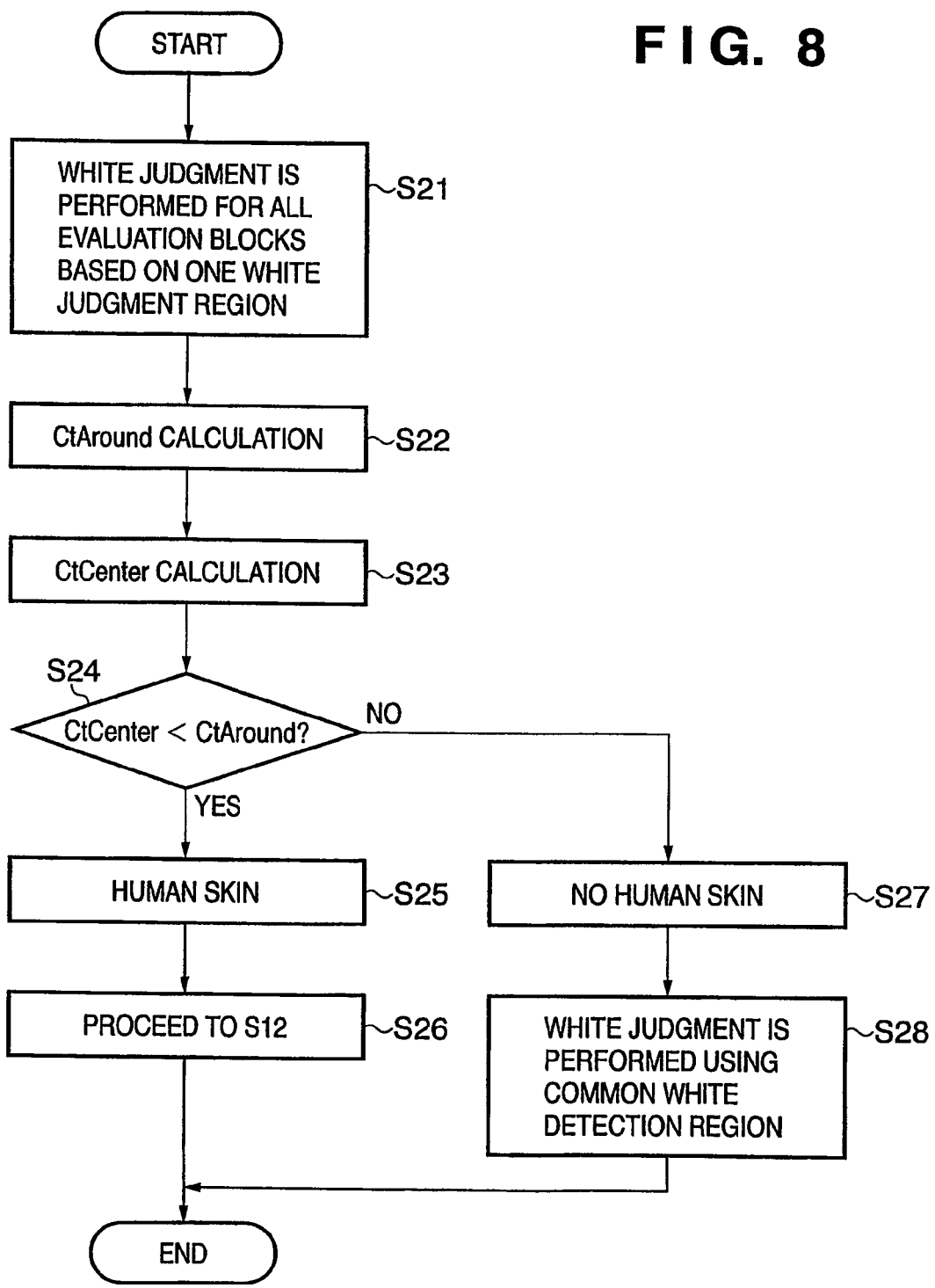
FIG. 8 is a diagram showing a flowchart illustrating a process for judging the presence of human skin in an auto mode according to a first preferred embodiment of the present invention.

To address this, before step S12 of FIG. 7 is performed, the presence of human skin is checked. When it is determined that human skin is present, the process proceeds to step S12 and subsequent steps. Thereby, it is possible to achieve a more precise white balance adjustment. This operation will be described below with reference to the flowchart of FIG. 8.

In step S21, the white judgment unit 35 detects evaluation blocks determined to be white (hereinafter referred to as "white evaluation blocks") which are determined using one white detection region for all the evaluation blocks, including the evaluation blocks in the center of the image sensing screen (the region (2) of FIG. 6A) and those in the peripheral region (the region (1) of FIG. 6A)). As used herein, the "one white detection region" refers to a region that is either limited or not limited by white detection limit values and includes a color temperature region of human skin. Specifically, the one white detection region can be either one of the first white detection region 201 and the second white detection region 203.

In step S22, a light source color temperature CtAround is calculated based on data obtained by integrating and averaging the image data of the white evaluation blocks in the peripheral region of the image sensing screen.

In step S23, a light source color temperature CtCenter is calculated based on data obtained by integrating and averaging the image data of the white blocks in the center of the image sensing screen. It is also possible to reverse the order of steps 22 and 23, or to perform steps 22 and 23 simultaneously.

In step S24, a comparison is made between CtAround and CtCenter. If the color temperature CtCenter of the center of the image sensing screen is lower than the color temperature CtAround of the peripheral region of the image sensing screen, then in step S25, it is determined that the possibility is high that human skin is present in the center of the image sensing screen. In other words, if CtCenter<CtAround is satisfied, it is determined that human skin is present in the center of the image sensing screen, and a white judgment shown in step S12 (auto mode) of FIG. 7 is performed and a light source color temperature is calculated (step S26).

Conversely, if the color temperature CtCenter of the center of the image sensing screen is almost equal to or higher than the color temperature CtAround of the peripheral region of the image sensing screen, it is determined that the possibility is high that no human skin is present in the center of the image sensing screen (step S27). In other words, if CtCenter≧CtAround is satisfied, it is determined that no human skin is present in the center of the image sensing screen, and all the evaluation blocks are compared with one white detection region to detect white blocks, and the obtained light source color temperature is used (step S28).

By adding the above process, the possibility of erroneous white judgment can be reduced, and a better white balance adjustment can be achieved.

In step S11 of FIG. 7, if the mode is judged to be a manual mode, white blocks are detected in the same manner as when it is determined that no human skin is present, that is, all the evaluation blocks are compared with the same white detection region to detect white blocks. Moreover, a light source color temperature obtained from the image data of the white blocks can be used.

In the foregoing, the white balance was determined after an image is generated by combining the divided regions formed by dividing an effective pixel region of an image sensing unit 200. However, it is also possible to determine the white balance for each divided region and perform a white balance adjustment using an average value of all the regions.

Second Embodiment

Figure 9A:
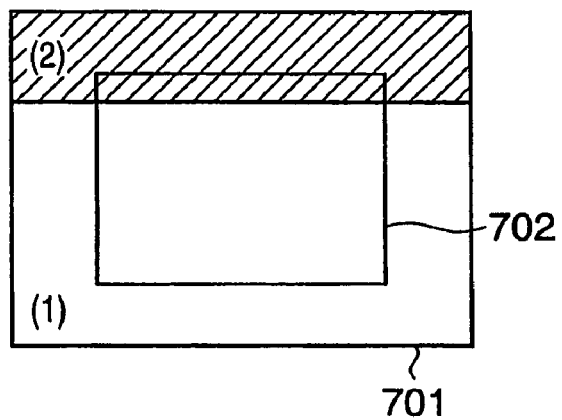
FIGS. 9A and 9B are diagrams showing divisions of an image sensing screen according to a second preferred embodiment of the present invention.
Figure 9B:
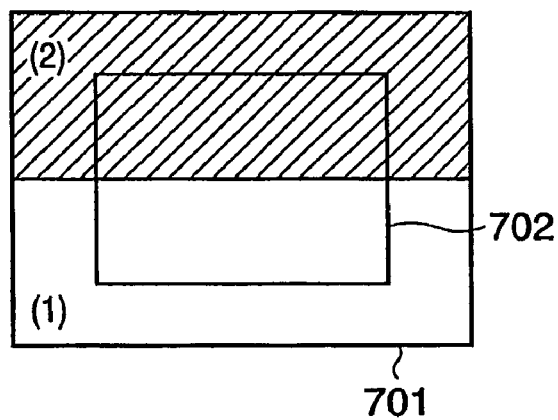

FIGS. 9A and 9B are diagrams showing examples of pattern settings for reducing the possibility that a blue sky is judged erroneously to be white. FIG. 9A shows an example of a pattern when an auto mode is set. FIG. 9A shows an example of a pattern when a landscape mode is set. An outer rectangular region 701 is a maximum angle of view of an image sensing unit 200. An inner rectangular region 702 is a pixel region (angle of view) that is read out by an electronic zoom. A region (1) is a region obtained by excluding a region (2) indicated by oblique lines from the rectangular region 701. Similarly to the first embodiment, an evaluation block is compared with a white detection region limited by different white detection limit values for the regions (1) and (2) so as to determine whether or not the evaluation block is white.

The color evaluation values of the evaluation blocks of an image region when a slightly cloudy sky or a sky near the horizon is captured have substantially the same distribution as the color evaluation values of a white point in a shade as described previously. Therefore, the evaluation blocks of a sky portion of the image may be judged erroneously to be white. In other words, because the angle of view becomes wider and thus the proportion of the sky increases, the sky may be judged erroneously to be white with a high color temperature.

To address this, different white detection regions are used for the upper portion (the region (2)) and the lower portion (the region (1)) of the image sensing screen as shown in FIG. 9A for white judgment.

The upper portion and the lower portion are limited by applying different white detection limit values on the high color temperature side by the white detection region changing unit 33.

Figure 10A:
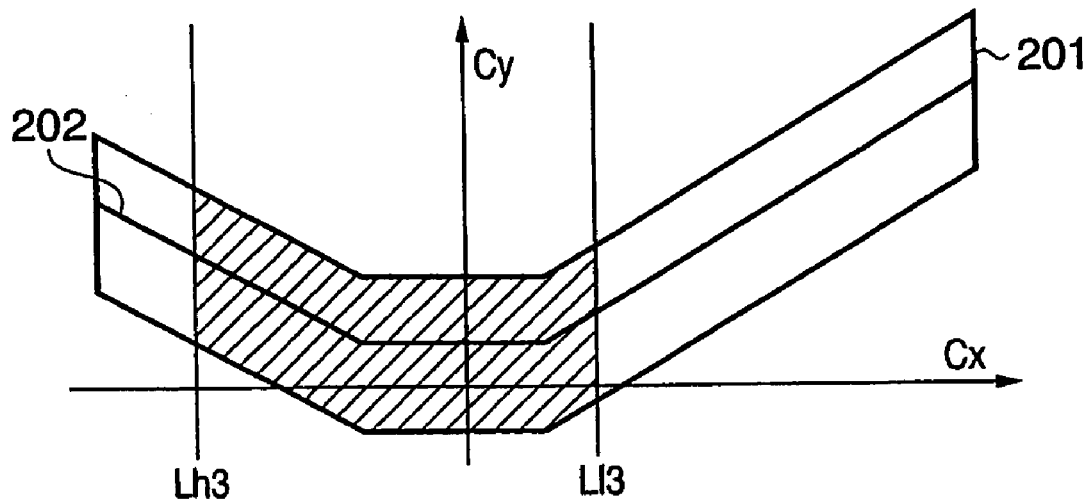
FIGS. 10A and 10B are graphs showing white detection regions according to a second preferred embodiment of the present invention.
Figure 10B:
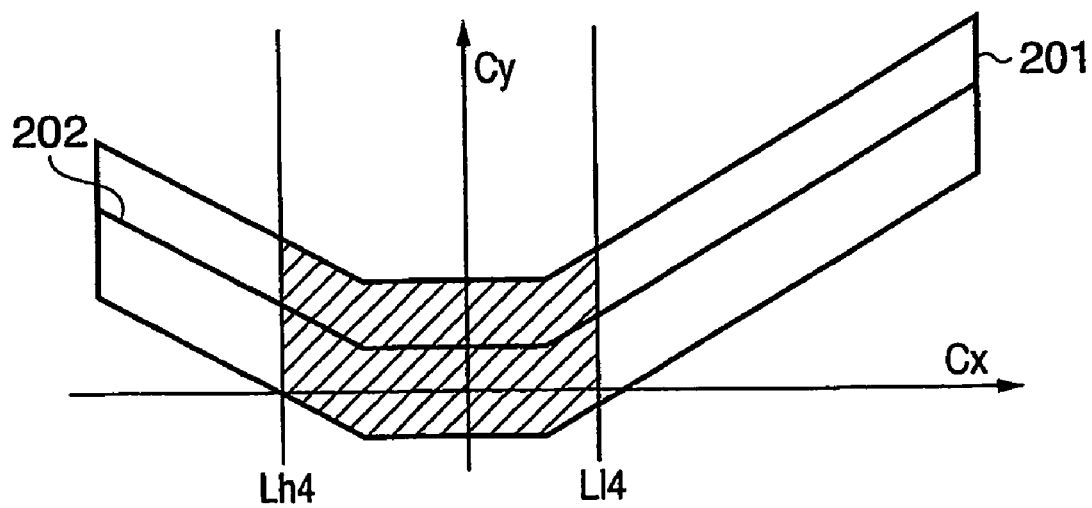

As shown in FIGS. 10A and 10B, the white detection limit value Lh4 on the high color temperature side that limits the white detection region for judging the evaluation blocks in the upper portion of the image sensing screen is set to be on the lower color temperature side of the white detection limit value Lh3 on the high color temperature side for judging the evaluation blocks in the lower portion of the image sensing screen. This ensures that light blue is not judged erroneously to be white. The limit values Ll13 and Ll14 are set to the same value as L11.

According to experiments, excellent results were obtained when the white detection limit value Lh4 was set to about 5500 K. However, the detection limit value Lh4 is not limited to 5500 K and can be changed as appropriate.

According to the second embodiment described above, different white detection regions are used depending on the positions of the image sensing screen, and thereby the angle of view becomes wider. Even when the proportion of sky increases, it is possible to reduce the possibility of erroneous white judgment. Consequently, a better white balance adjustment can be achieved.

When the capture mode of the camera is set to a landscape mode, by further increasing the area of the upper region (2) as shown in FIG. 9B, it is possible to further reduce the possibility that a blue sky portion is judged erroneously to be white.

Figure 11:
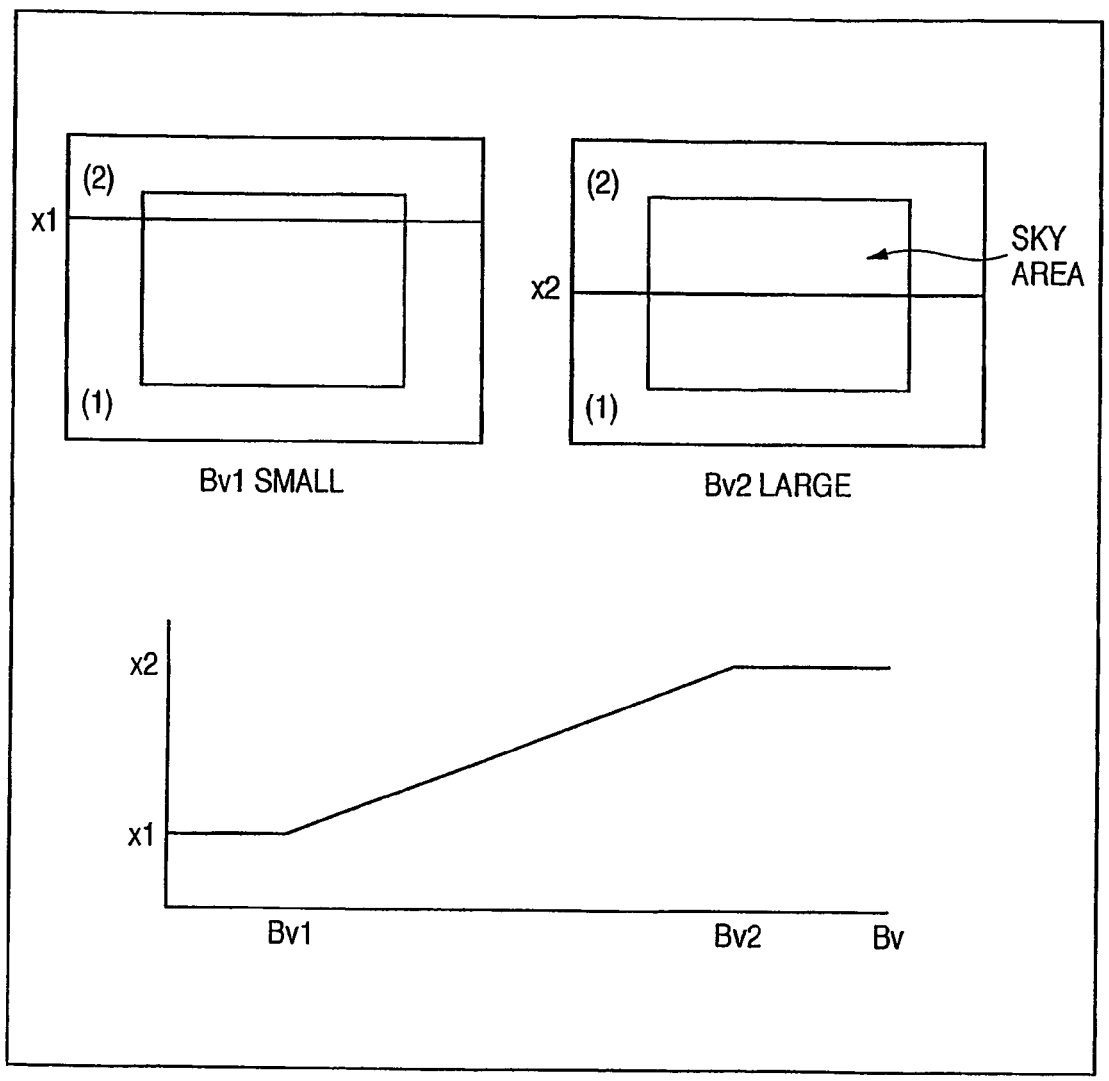
FIG. 11 is a diagram showing an example of a detection pattern for detecting a white region on an image sensing screen of a display unit according to the brightness of an object.
Figure 14A:
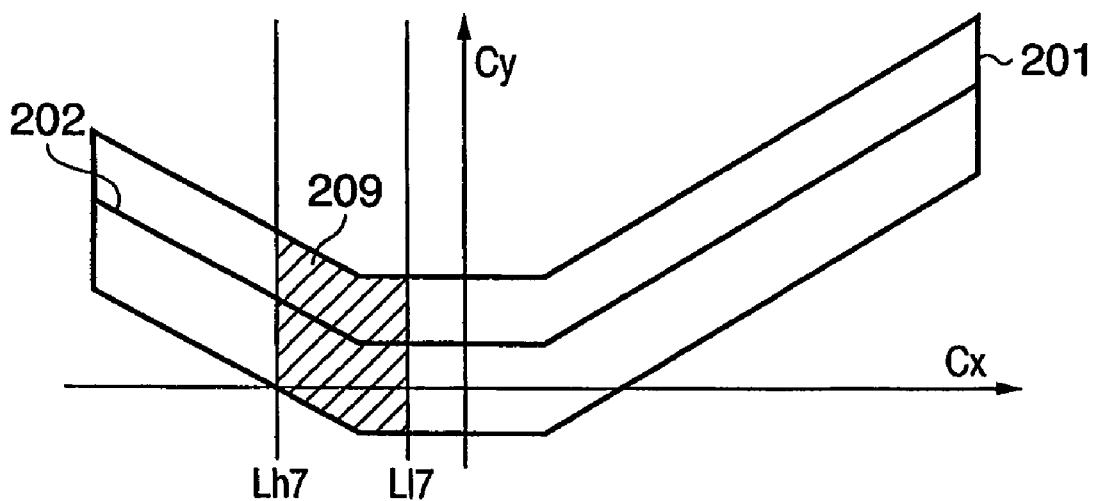
FIGS. 14A and 14B are graphs showing white detection regions according to a third preferred embodiment of the present invention.

In the second embodiment, it is also possible to detect a brightness By of an object from the captured image data, and to change the detection pattern for white detection to those as shown in FIGS. 9A and 9B, depending on the brightness. For example, as shown in FIG. 11, if the brightness By is greater than a preset value Bv2, it is very likely that the image has been captured outdoors (i.e., the area of sky accounts for a large proportion), so the proportion of the evaluation blocks in the upper portion of the image sensing screen whose white detection range is limited by the white detection region 209 shown in FIG. 14A is increased. Conversely, if the brightness BV is lower than a preset value Bv1 (<Bv2), it is very likely that the image has been captured indoors, so the proportion of the evaluation blocks in the upper portion of the image sensing screen is reduced. If the brightness Bv falls between the preset values Bv1 and Bv2, the proportion of the evaluation blocks in the upper portion of the image sensing screen whose white detection range is limited by the white detection region 209 is determined by a linear computation with Bv as shown in the graph of FIG. 11. This process enables a more appropriate white balance adjustment.

In the foregoing, the white balance was determined after one image is generated by combining the divided regions formed by dividing an effective pixel region of an image sensing unit 200. However, it is also possible to determine the white balance for each divided region and perform a white balance adjustment using an average value of all the regions.

Third Embodiment

FIG. 12 is a diagram showing an example of a pattern setting for reducing an erroneous white judgment when both human skin and sky are captured. An outer rectangular region 901 is a maximum angle of view of an image sensing unit 200.

An inner rectangular region 902 is a pixel region (angle of view) that is partially read out by an electronic zoom. The rectangular regions 901 and 902 are divided by a borderline 905 into upper and lower regions. Likewise, the center circular region is also divided into a semicircular region 903 and a semicircular region 904 by the borderline 905. A region (3) corresponds to the semicircular region 903, and a region (4) corresponds to the semicircular region 904. A region (1) is a region obtained by excluding the regions (2) to (4) from the rectangular region 901. The region (2) is a region obtained by excluding the regions (1), (3) and (4) from the rectangular region 901. The dimension of the regions (3) and (4) can be fixed according to the capture mode, or enlarged or reduced in response to a change in size of the angle of view by an electronic zoom. In this embodiment, by way of example, when the following settings are used for white judgment of the evaluation blocks in the regions (1), (2), (3) and (4) of FIG. 12, excellent results can be obtained.

Figure 13A:
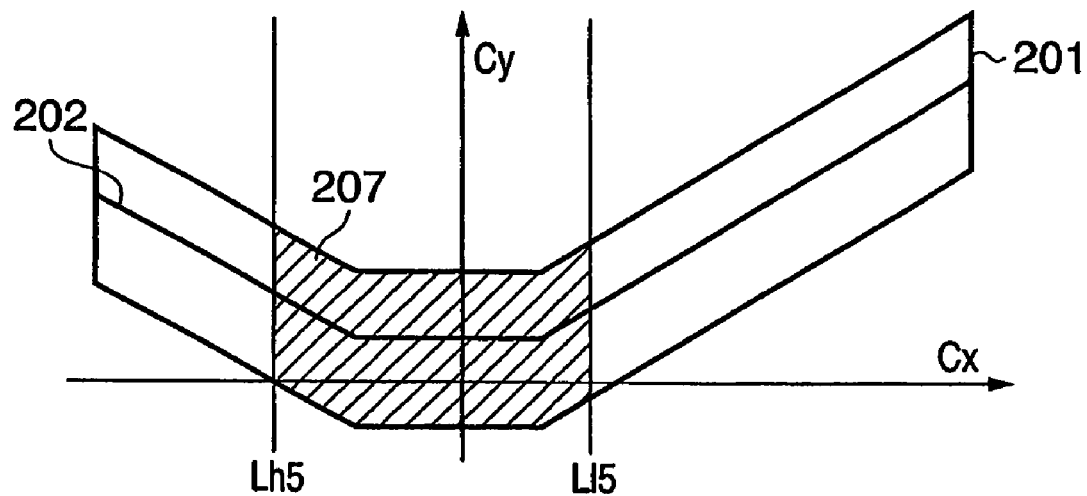
FIGS. 13A and 13B are graphs showing white detection regions according to a third preferred embodiment of the present invention.
Figure 13B:
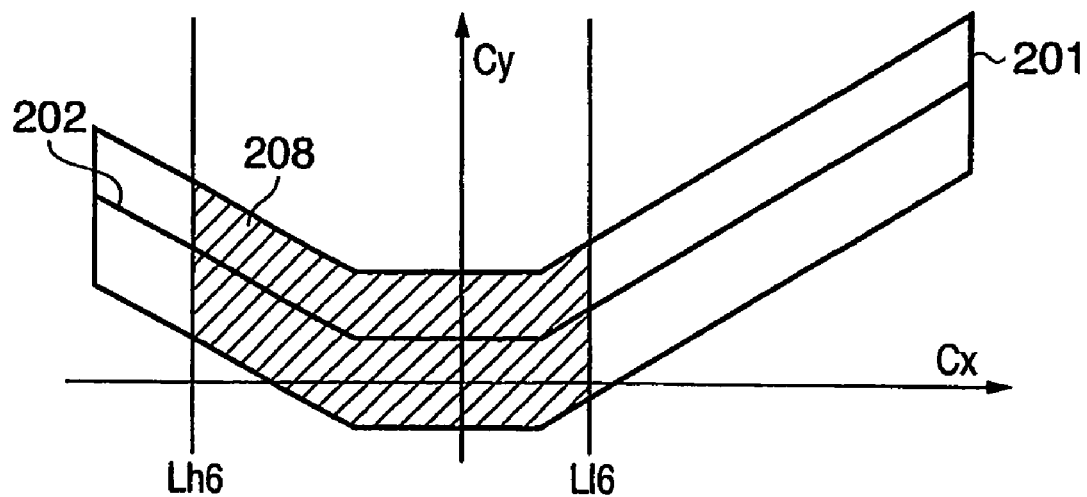
Figure 14B:
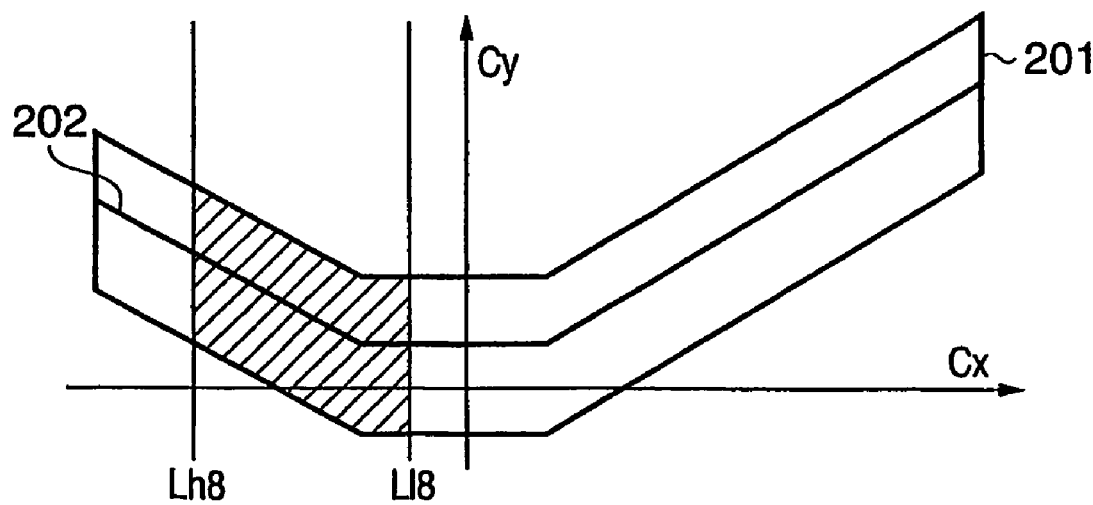

For the region (1)
White detection limit value Lh5 on the high color temperature side: 5500 K
White detection limit value Ll5 on the low color temperature side: variable brightness (FIG. 13A)
For the Region (2)
White detection limit value Lh6 on the high color temperature side: variable brightness
White detection limit value Ll6 on the low color temperature side: variable brightness (FIG. 13B)
For the Region (3)
White detection limit value Lh7 on the high color temperature side: 5500 K
White detection limit value Ll7 on the low color temperature side: 5000 K (FIG. 14A)
For the Region (4)
White detection limit value Lh8 on the high color temperature side: variable brightness
White detection limit value Ll8 on the low color temperature side: 5000 K (FIG. 14B)

It is to be understood that the values of the white detection limit values Lh5, Lh7, Ll7 and Ll8 are merely examples, and the present invention is not limited thereto and they can be changed as appropriate.

As described above, according to the third embodiment, the white judgment is performed using a pattern in which the image sensing screen is divided into smaller regions, and using different white detection regions depending on the position of the image sensing screen. Accordingly, it is possible to reduce the possibility of erroneous white judgment even when both human skin and sky are captured. Consequently, a more precise white balance adjustment can be achieved.

Similarly to the first embodiment, the pattern can be changed according to the capture mode.

In the foregoing, the white balance was determined after an image is generated by combining the divided regions formed by dividing an effective pixel region of an image sensing unit 200. However, it is also possible to determine the white balance for each divided region and perform a white balance adjustment using an average value of all the regions.

Fourth Embodiment

In the first to third embodiments, white balance coefficients are calculated based on the electrical signals read out from divided regions formed by dividing an effective pixel region of an image sensing unit 200 into a plurality of regions.

However, it is also possible to calculate color evaluation values Cx, Cy and Y based on Equations (1) given previously for each of a plurality of divided blocks as shown in FIG. 26.

The color evaluation values Cx and Cy for each block calculated by the above Equations (1) are compared with a preset white detection region, which will be described later. When the color evaluation values fall within the white detection region, the block is assumed to be white. Then, the integral values (SumR, SumG, SumB) of the color pixels of the block assumed to be white are calculated.

From the integral values, white balance gains (kWB_R, kWB_G and kWB_B) for R, G and B are calculated using Equations (2) given previously, using the following equation.

In the WB circuit 516, the white balance gains thus obtained can be used to perform a white balance adjustment.

Fifth Embodiment

Figure 16:
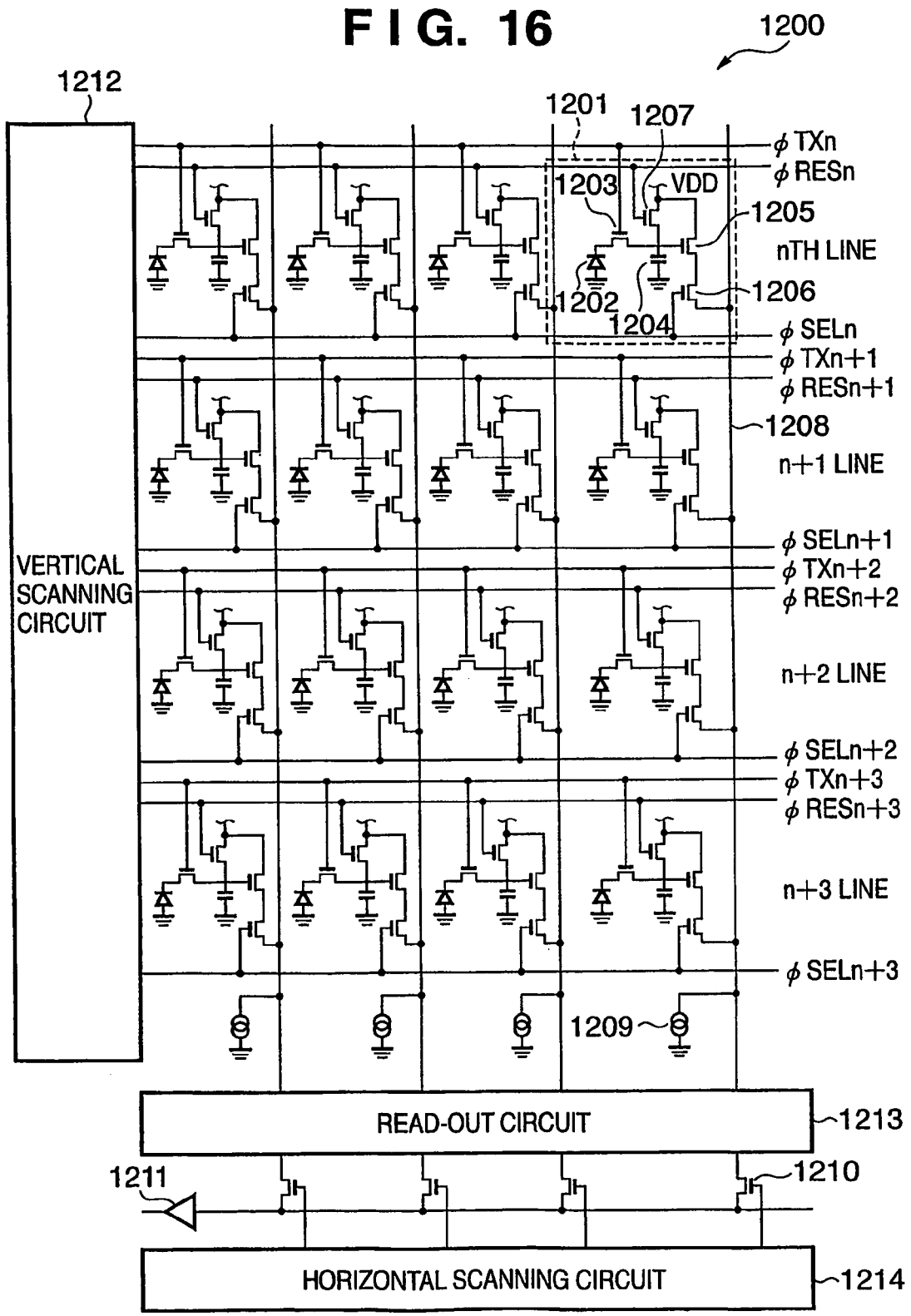
FIG. 16 is a schematic diagram of an image sensing apparatus according to a fifth preferred embodiment of the present invention.

Hereinafter, with reference to the accompanying drawings, a fifth preferred embodiment of the present invention will be described in detail. An image sensing apparatus according to this embodiment includes an image sensing unit in which photoelectric conversion elements are arranged on an image sensing plane and a control unit that controls the image sensing unit. FIG. 16 is a diagram showing a configuration of an image sensing unit 1200 of an image sensing apparatus using an X-Y address scanning method (see FIG. 19).

In the image sensing unit 1200, a plurality of unit pixels 1201 are arranged. In each unit pixel 1201, a photoelectric conversion element 1202 such as a photodiode, a transfer switch 1203, a floating diffusion (hereinafter referred to as "FD") 1204, an amplifying transistor 1205, a selection switch 1206 and a reset switch 1207 are arranged. Reference numeral 1208 denotes signal output lines, and reference numeral 1209 denotes a constant current source serving as a load for the amplifying transistor 1205. Reference numeral 1210 denotes selection switches, reference numeral 1211 denotes an output amplifier, reference numeral 1212 denotes a vertical scanning circuit, reference numeral 1213 denotes a read-out circuit, and reference numeral 1214 denotes a horizontal scanning circuit. In the image sensing unit 1200 shown in FIG. 16, in order to simplify the drawing, the unit pixels 1201 are arranged in a four row by four column (4×4) matrix, but the present invention is not limited thereto and any number of unit pixels 1201 can be arranged.

The light that enters the image sensing apparatus is converted to electrical charges in the photoelectric conversion elements 1202. The electrical charges generated in the photoelectric conversion element 1202 are transferred by the transfer switch 1203 in response to a transfer pulse $\phi$TX to the FD 1204 where the electrical charges are stored temporarily. The FD 1204, the amplifying transistor 1205 and the constant current source 1209 constitute a floating diffusion amplifier. The signal charges of the pixels selected by the selection switches 1206 in response to a selection pulse $\phi$SEL are converted to a voltage, which is then outputted through the signal output lines 1208 to the read-out circuit 1213. Further, output signals are selected by electrically connecting, in a selective manner, the selection switches 1210 driven by the horizontal scanning circuit 1214, and the output signals are then outputted via the output amplifier 1211 to the outside of the image sensing apparatus. The electrical charges stored in the FD 1204 are removed by the reset switch 1207 in response to a reset pulse PRES. The vertical scanning circuit 1212 performs a selection among the transfer switch 1203, the selection switch 1206 and the reset switch 1207. The pulse signals $\phi$TX, $\phi$RES and $\phi$SEL applied to an nth (n being a natural number) scanning row and selected by the vertical scanning circuit 1212 are represented by φTXn, φRESn and φSELn, respectively.

Figure 17A:
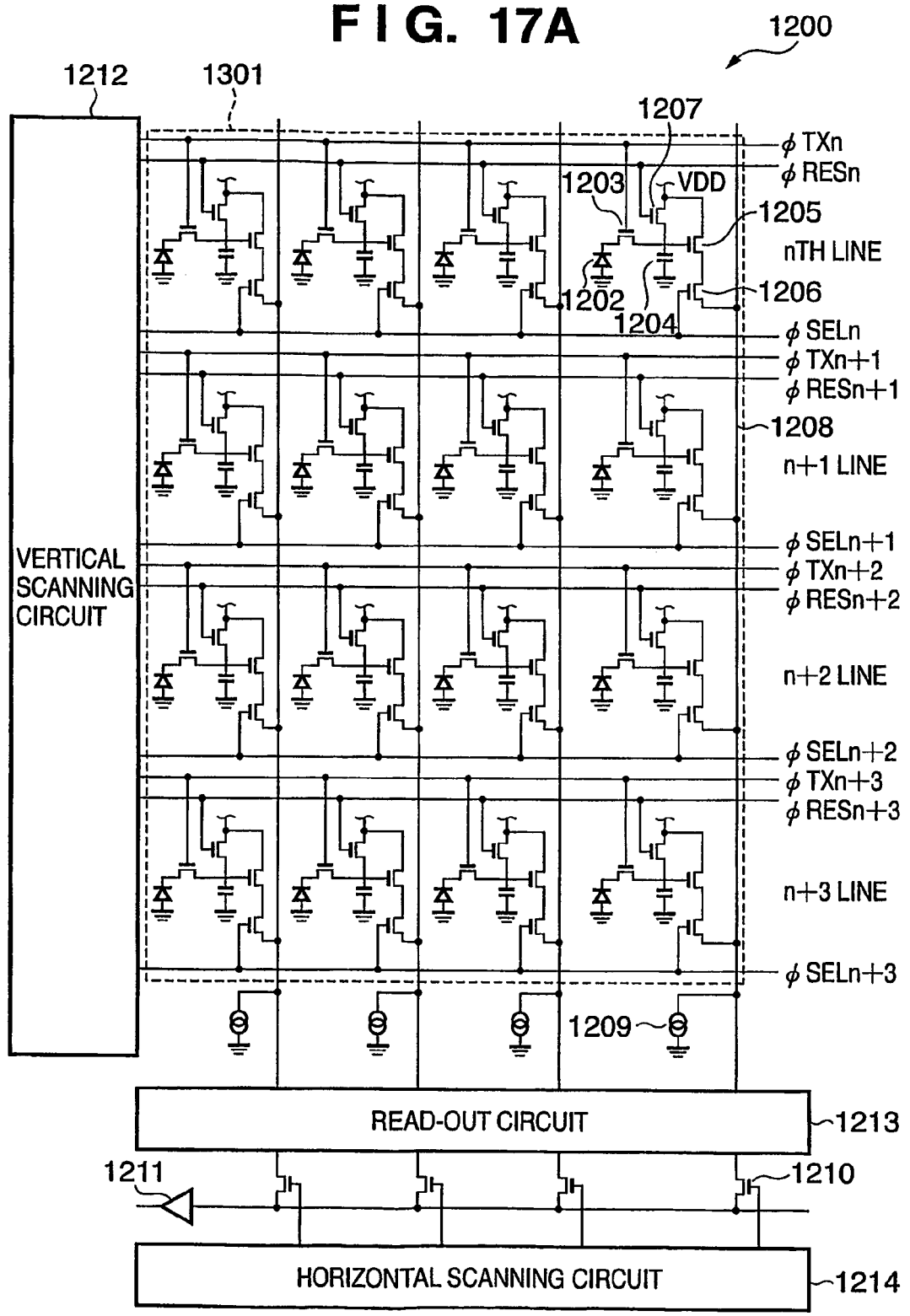
FIGS. 17A and 17B are schematic diagrams of an image sensing apparatus according to a fifth preferred embodiment of the present invention.
Figure 17B:
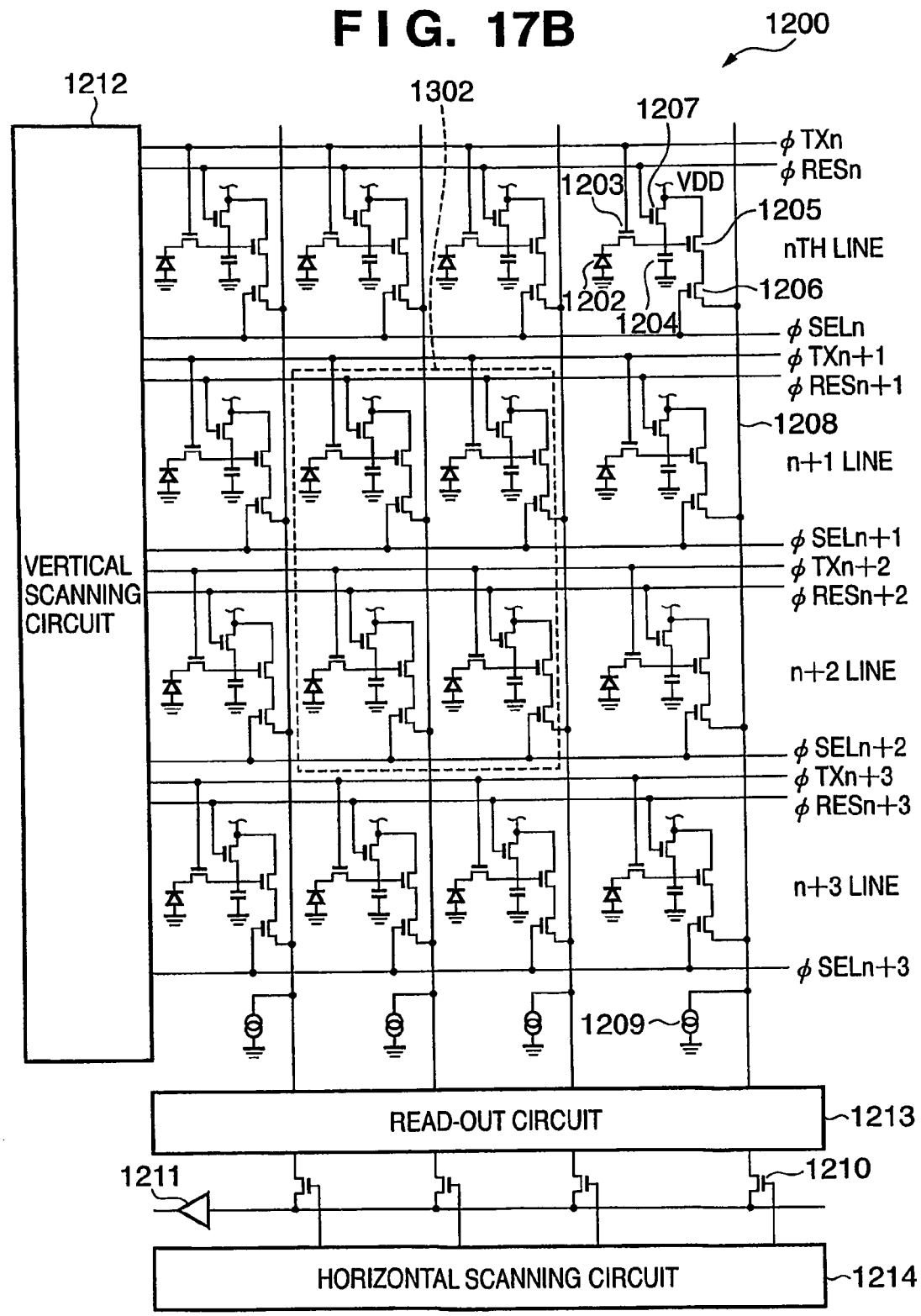

FIGS. 17A and 17B are diagrams showing an operation of an image sensing apparatus according to this embodiment. FIG. 17A shows an operation in the first mode, and FIG. 17B shows an operation in the second mode.

Figure 19:
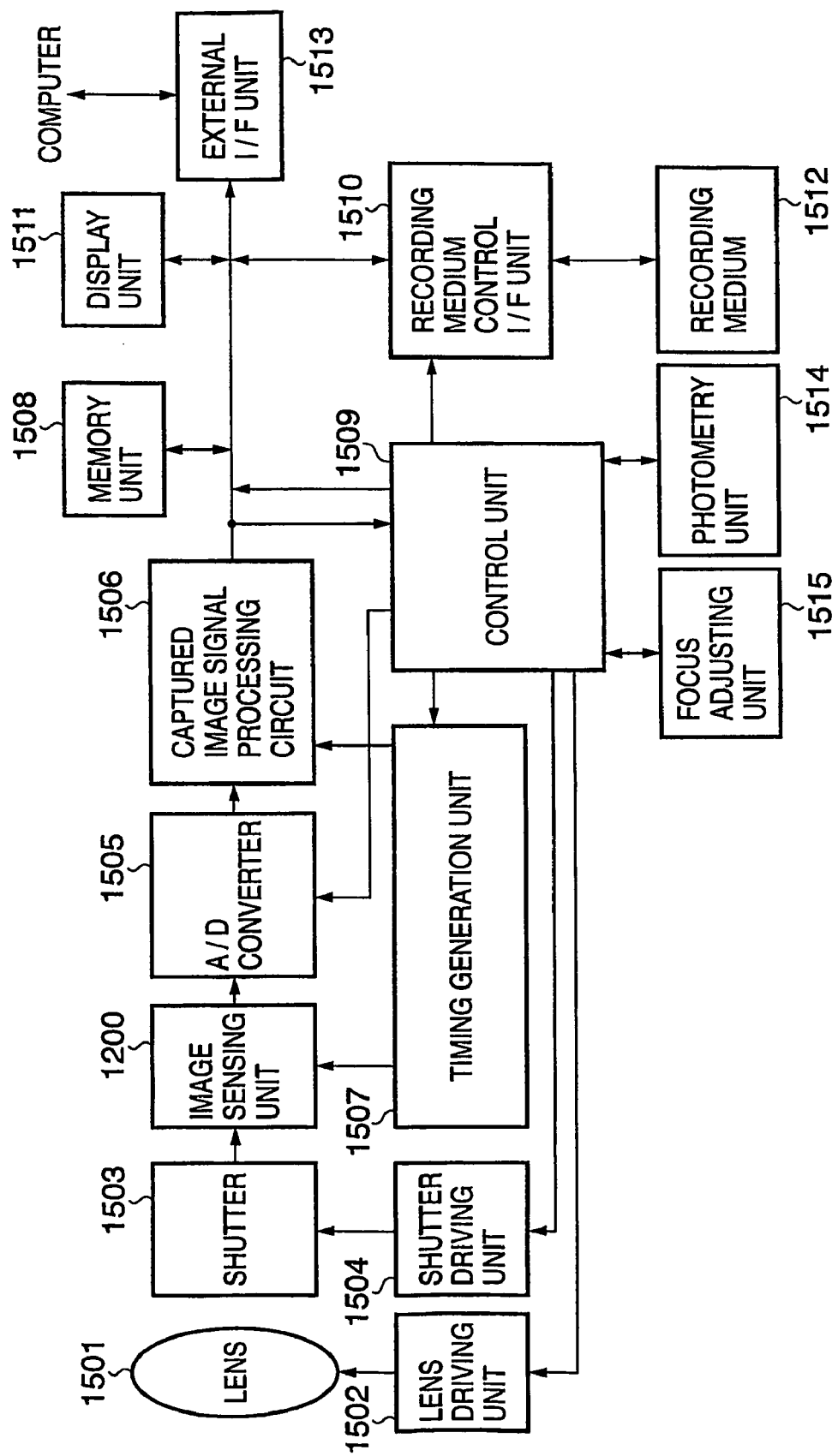
FIG. 19 is a schematic diagram of an image sensing system according to a fifth preferred embodiment of the present invention.

As shown in FIG. 17A, in the first mode, a control unit 1509 of FIG. 19 controls the image sensing unit 1200 to read out the image signals from the group of photoelectric conversion elements 1202 arranged in the first region 1301 on the image sensing plane. The first mode is used for calculating correction values for use in white balance processing based on the read-out image signals.

On the other hand, as shown in FIG. 17B, in the second mode, the control unit 1509 controls the image sensing unit 1200 to read out the image signals from the group of photoelectric conversion elements 1202 arranged in the second region 1302 on the image sensing plane. The second mode is used for recording or displaying an image.

The first region 1301 can have any size as long as it is larger than the second region 1302. Preferably, the first region 1301 includes the second region 1302. More preferably, the first region 1301 includes all the photoelectric conversion elements arranged on the image sensing plane. In the image sensing apparatus according to this embodiment, it is preferable that the read-out circuit 1213 incorporates an adding unit (not shown) for adding some of the plurality of signals read out from the first photoelectric conversion element group in the first mode. In this case, it is preferable that the control unit 1509 sets the number of signals to be added in the adding unit such that the frame rates used in the first and second modes are the same (i.e., in the first and second modes, the same number of signals is read out from the image sensing unit 1200). By adding some of the plurality of signals read out from the first photoelectric conversion element group and outputting these signals, the number of signals read out from the horizontal scanning circuit 1214 can be reduced.

The control unit 1509 may read out the first photoelectric conversion element group while performing a thinning in the first mode. In this case, it is preferable that the control unit 1509 sets a thinning rate such that the frame rates used in the first and second modes are the same (i.e., in the first and second modes, the same number of signals is read out from the image sensing unit 1200).

According to the configuration above, even when a high electronic zoom, which is likely to have a reduced proportion of white, is used, it is possible to use WB coefficients calculated from an image of the first region 1301 which is likely to include white. Accordingly, appropriate WB processing can be performed. For example, even when the proportion of chromatic colors is higher than that of white, as in the case where a person is captured in a close-up manner using a zoom, appropriate WB processing can be performed by using a color temperature specified from an image of the first region 1301, which is likely to include white.

FIG. 18 is a diagram showing a part of a color filter array used in the image sensing apparatus of FIG. 16. FIG. 18 illustrates a case where the color of a first color filter is red (R), the color of a second color filter is green (G), the color of a third color filter is green (G) and the color of a fourth color filter is blue (B). The arrangement of this color filter array is particularly called "Bayer arrangement" among the color filter arrangements of primary colors. This color filter arrangement has a high resolution and excellent color reproducibility.

FIG. 19 is a diagram showing an overview of an image sensing system using the image sensing apparatus of FIG. 16.

Reference numeral 1501 denotes a lens unit serving as an optical system (simply referred to as "lens" in FIG. 19), reference numeral 1502 denotes a lens driving unit, reference numeral 1503 denotes a mechanical shutter (simply referred to as "shutter"), reference numeral 1504 denotes a mechanical shutter driving unit (simply referred to as "shutter driving unit" in FIG. 19), reference numeral 1505 denotes an A/D converter, and reference numeral 1200 denotes an image sensing unit configured as shown in FIG. 16.

Reference numeral 1506 denotes a captured image signal processing circuit, reference numeral 1507 denotes a timing generation unit, reference numeral 1508 denotes a memory unit, reference numeral 1509 denotes a control unit, reference numeral 1510 denotes a recording medium control interface unit (simply referred to as "recording medium control I/F unit" in FIG. 19), reference numeral 1511 denotes a display unit, reference numeral 1512 denotes a recording medium, reference numeral 1513 denotes an external interface unit (simply referred to as "external I/F unit" in FIG. 19), reference numeral 1514 denotes a photometry unit, and reference numeral 1515 denotes a focus adjusting unit.

An object image passing through the lens 1501 is formed on the image sensing unit 1200. The object image formed on the image sensing unit 1200 is inputted in the form of an image signal. The image signal is amplified and converted from analog to digital signal form (A/D conversion) by the captured image signal processing circuit 1506. After the A/D conversion, the captured image signal processing circuit 1506 obtains R, G1, G2, B signals as shown in FIG. 21A and performs various adjustments, image data compression, etc.

Zoom, Focus and aperture of the lens 1501 are driven and controlled by the lens driving unit 1502. The mechanical shutter 1503 is a shutter mechanism having only a screen corresponding to the rear screen of a focal plane shutter for use in single lens reflex cameras. The mechanical shutter 1503 is driven and controlled by the shutter driving unit 1504. The timing generation unit 1507 outputs timing signals to the image sensing unit 1200 and the captured image signal processing circuit 1506. The control unit 1509 performs the control of the entire image sensing system and various computations. The memory unit 1508 stores image data temporarily. The recording medium control I/F unit 1510 records image data on the recording medium 1512 or reads out image data from the recording medium 1512. The display unit 1511 displays image data. The recording medium 1512 is a removable storage medium such as a semiconductor memory and records image data. The external I/F unit 1513 is an interface for communicating with an external computer or the like. The photometry unit 1514 detects information on brightness of an object. The focus adjusting unit 1515 detects the distance to the object.

Figure 20:
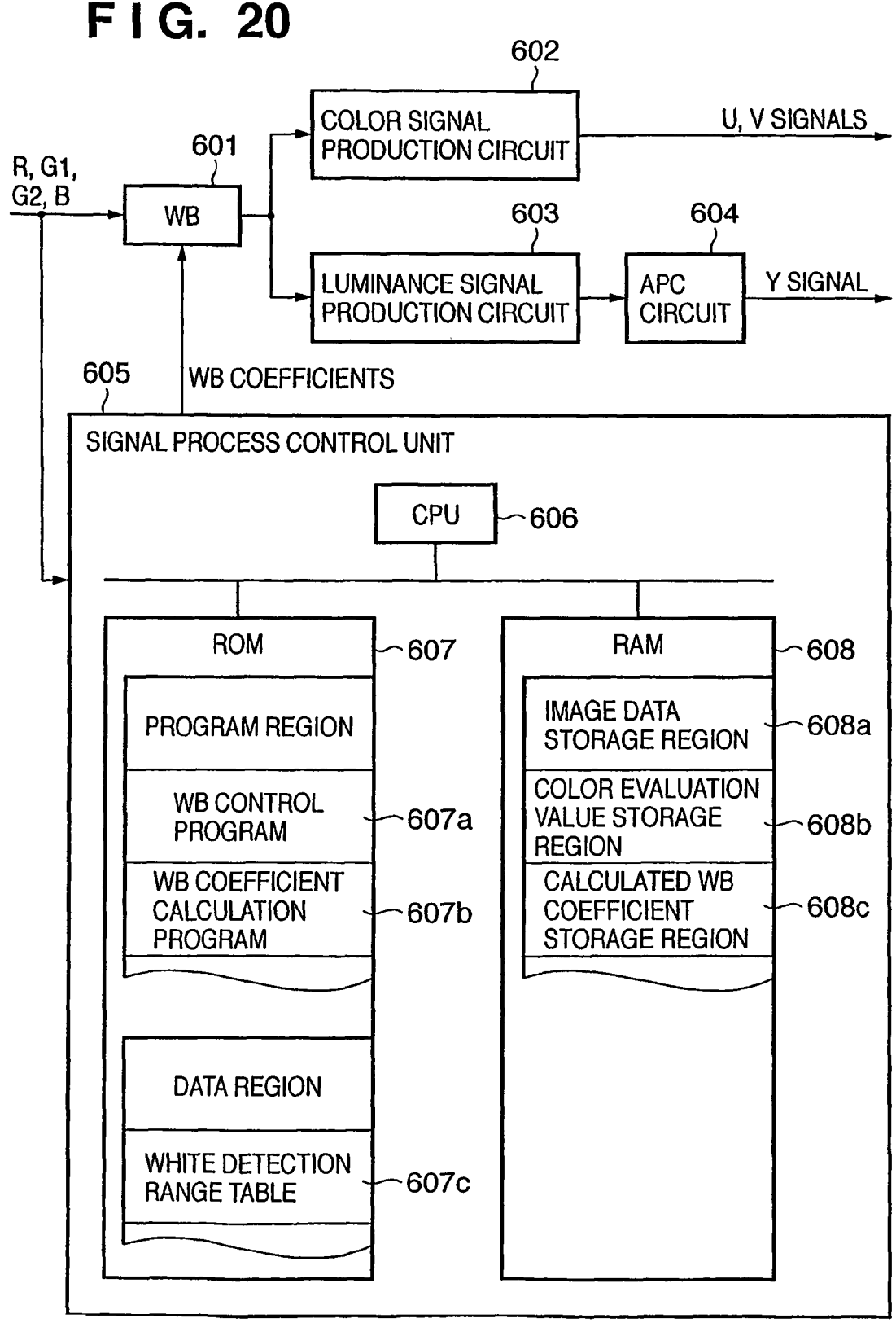
FIG. 20 is a block diagram showing an example of a configuration of parts involved in a white balance processing according to a fifth preferred embodiment of the present invention.

FIG. 20 is a block diagram showing an example of a configuration for WB circuit control of a WB processing circuit 601 that performs a process based on the signals R, G1, G2 and B from the A/D converter 1505 and a signal process control unit 605 included in the captured image signal processing circuit 1506 of FIG. 19.

Reference numeral 601 denotes the WB processing circuit (simply referred to as "WB" in FIG. 20), reference numeral 602 denotes a color signal production circuit, reference numeral 603 denotes a luminance signal production circuit, reference numeral 604 denotes an APC (Automatic Power Control) circuit serving as an adjustment unit, and reference numeral 605 denotes a signal process control unit. Reference numeral 606 denotes a CPU, reference numeral 607 denotes a ROM, and reference numeral 608 denotes a RAM. The ROM 607 includes a WB control program 607a, a WB coefficient calculation program 607b and a white detection range table 607c. The RAM 608 includes an image data storage region 608a, a color evaluation value storage region 608b and a calculated WB coefficient storage region 608c.

To the WB processing circuit 601 and the signal process control unit 605, the digital image signals R, G1, G2 and B shown in FIG. 21A are inputted on a block unit basis shown in FIG. 21B. The signal process control unit 605 provides WB coefficients determined based on the inputted digital image signals R, G1, G2 and B to the WB processing circuit 601, where a WB process is performed.

The signal process control unit 605 is made up of the CPU 606 for computation control, the ROM 607 for storing fixed programs and data and the RAM 608 for temporary storage. According to this embodiment, a WB process is performed on the assumption that the ROM 607 already stores processing programs and tables. However, it is also possible to store them in a rewritable nonvolatile RAM so that they can be changed.

Figure 22:
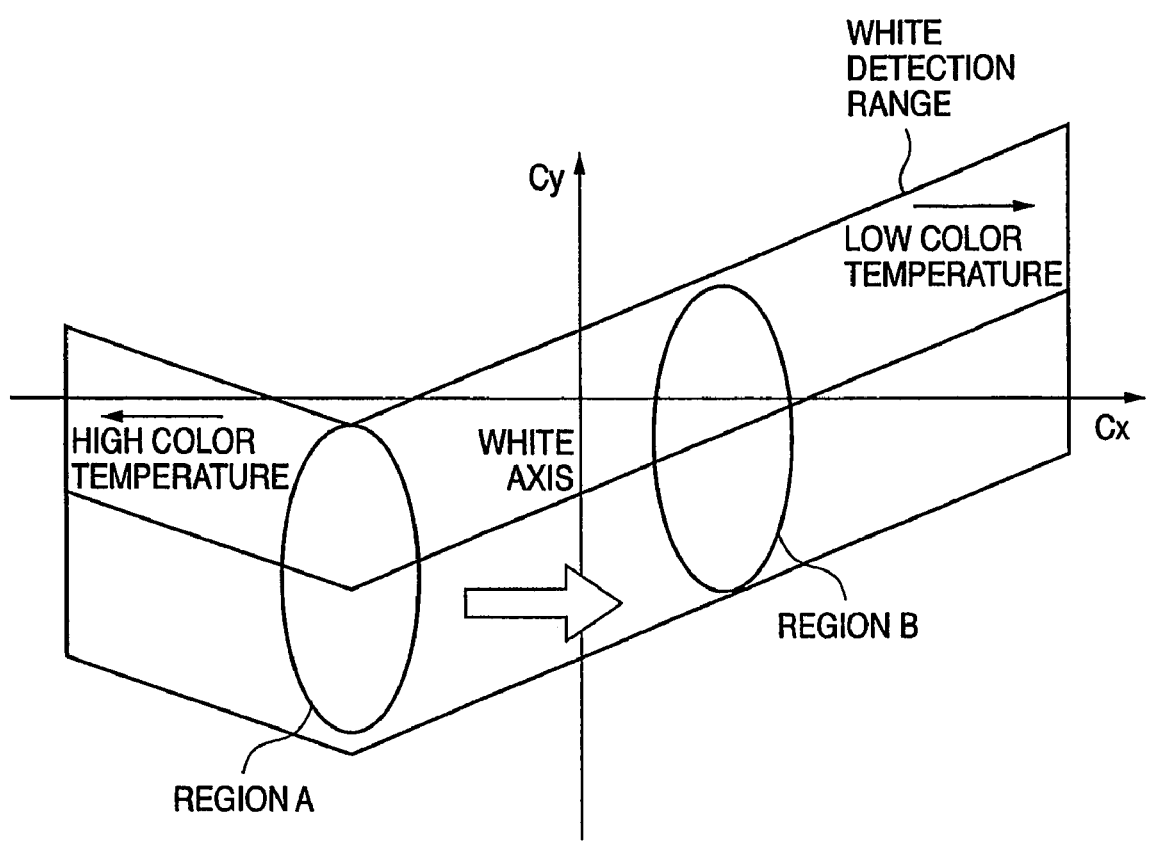
FIG. 22 is a graph showing an example of a white detection range.

The ROM 607 has a program storage region and a data storage region. In this embodiment, the program storage region has a WB control program 607a containing procedures for a WB process and a WB coefficient calculation program 607b for determining WB coefficients as described in the BACKGROUND OF THE INVENTION section. The data storage region has a white detection range table 607c as shown in FIG. 22.

The RAM 608 has an image data storage region 608a for storing an amount of data necessary to perform WB processing from the inputted image data, a color evaluation value storage region 608b for storing color evaluation values, and a calculated WB coefficient storage region 608c for storing the calculated WB coefficients based on actual time.

In this embodiment, the data is used in accordance with the programs contained in the ROM 607. Based on the digital image data R, G1, G2 and B inputted by the CPU 606, with the use of the regions of the RAM 608, WB coefficients are calculated, selected and determined. The determined WB coefficients are transferred to the WB 601 where an appropriate WB processing is performed.

After the WB processing is done in the WB 601, in the color signal production circuit 602, color-difference signals U and V are generated. At the same time, a luminance signal Y is generated through the luminance production circuit 603 for generating luminance signals and the APC circuit 604 for amplifying the high frequency component of the luminance signals. From the color-difference signals U, V and the luminance signal Y, a color image is obtained.

The way the generated color-difference signals U, V and the luminance signal Y are processed varies depending on the use/application of the image sensing apparatus. However, any processing methods can be applied to this embodiment.

Figure 15:
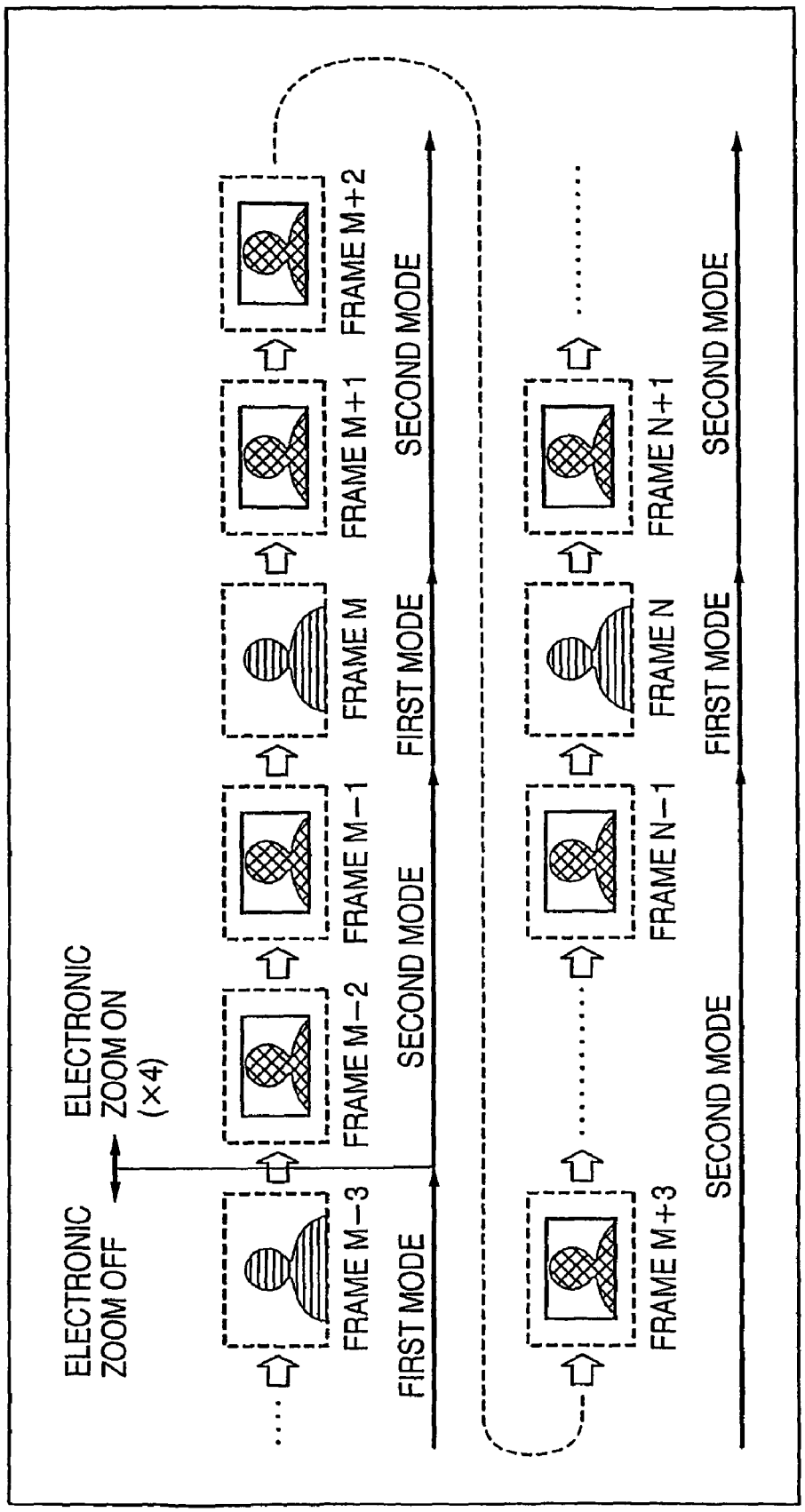
FIG. 15 is a conceptual diagram showing an operation of an image sensing apparatus according to a fifth preferred embodiment of the present invention.

FIG. 15 is a conceptual diagram showing an operation according to this embodiment. As an example of this embodiment, an exemplary operation of an image sensing apparatus in a moving image mode at an electronic zoom magnification of 4 (×4) is shown.

Figure 23:
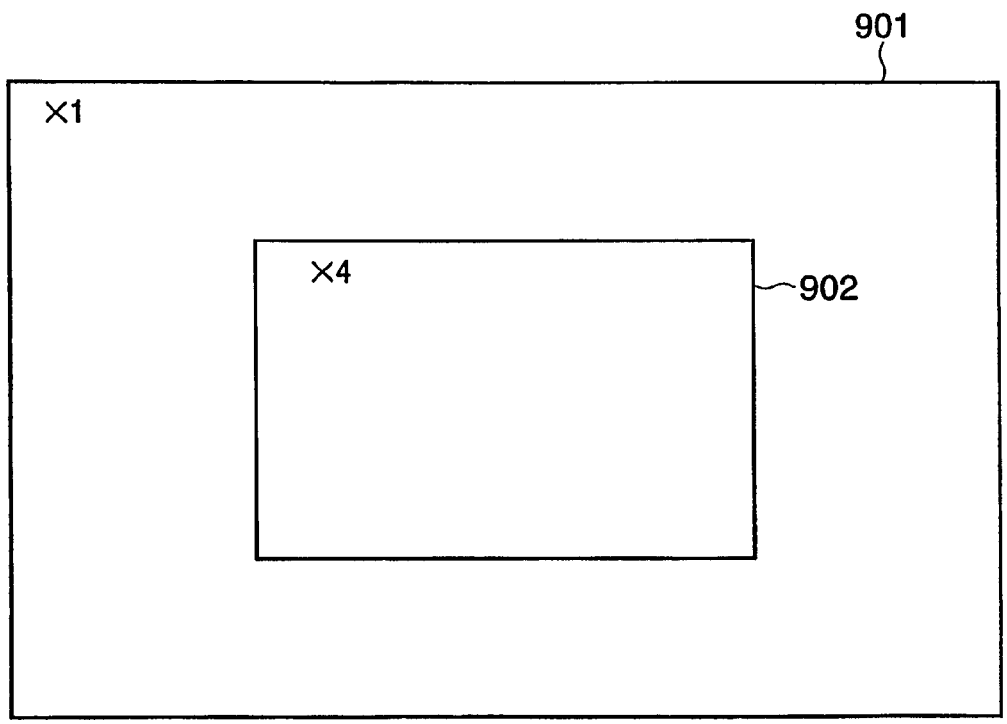
FIG. 23 is a diagram showing an example of an effective pixel region of an image sensing apparatus according to a fifth preferred embodiment of the present invention.
Figure 25:
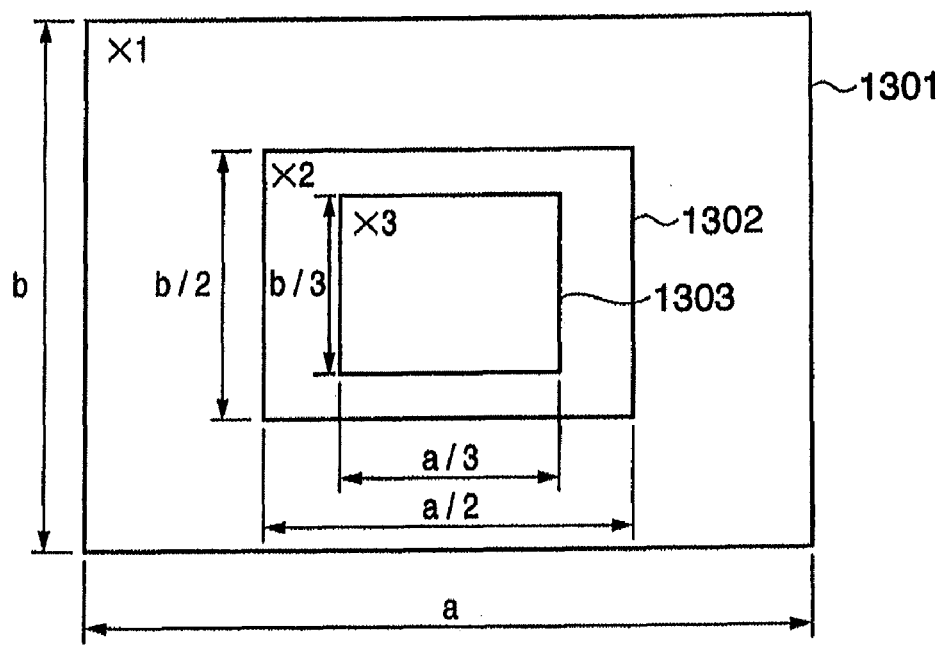
FIG. 25 is a conceptual diagram of an electronic zoom.

FIG. 15 illustrates the output data of a moving image in successive frames M−3 to N+1 (where N>M, and M and N are integers) arranged in temporal order. When an image signal is read out at a rate of m frames (m being an integer equal to or greater than 2) per second, n frames (n being an integer equal to or greater than 1 and smaller than m) of the m frames are read out in the first mode, and m−n frames of the m frames are read out in the second mode. Frame M−3 is a frame in which the electronic zoom is OFF, before an electronic zoom is set. This frame is read out while the image sensing unit is driven in the first mode. Frames M−2 and subsequent frames are frames in which the electronic zoom is ON. These frames are read out while the image sensing unit is driven either in the first or the second mode. In the first mode, the rectangular region 901 of FIG. 23 corresponding to an effective pixel region is read out by, for example, reading every two lines in the vertical direction in an image sensing unit 1200. In the second mode, the rectangular region 902 of FIG. 23 is read out in the image sensing unit 1200. The rectangular region 901 corresponds to the first region 1301 of FIG. 25. The rectangular region 902 corresponds to the second region 1302 of FIG. 25. The rectangular region 902 is, for example, a region extending from the center of the rectangular region 901 up to the half the diagonal direction of the rectangular region 901. The rectangular region 902 is obtained when an electronic zoom magnification of 4 (×4) is applied to the rectangular region 901. It is preferable to set the frame rate for the case that the image sensing unit 1200 is driven in the first mode and the frame rate for the case that it is operated in the second mode to the same frame rate.

Before Frame M−3, the image sensing unit 1200 is driven in the first mode. After Frame M−2, the image sensing unit 1200 is driven either in the first mode or the second mode. As shown by Frames M and Frames N, the image sensing unit 1200 is driven in the first mode to process one frame between every predetermined number of frames. For example, when one frame is processed every 10 seconds and the frame rate is set to 30 frames per second, the first mode is carried out to process one frame between every 300 frames. Then, based on the Frames M, N read out in the first mode, correction values for WB processing are calculated, and the correction values are reflected to Frames M+1, N+1 and subsequent frames. For the Frames M, N read out while the image sensing unit is driven in the first mode, a region smaller than the angle of view of the read-out frame is cut out, and the cut-out image is resized to obtain an output image. Preferably, in the captured image signal processing circuit 1506, a region having an angle of view equal to that of the frame read out in the second mode is cut out, and the image is resized to obtain an output image. By using the image read out in the first mode as an output image as described above, the frame rate can be maintained at a predetermined level. In this case, because the image obtained by resizing an image read out in the first mode has a lower resolution than the image read out in the second mode, it is preferable to perform an adjustment to reduce the resolution difference in the APC circuit 604 serving as an adjustment unit. More specifically, an APC process is performed to increase the amplification factor of the high frequency luminance signal.

Using the above method, it is possible to perform an appropriate WB process even when the proportion of white is likely to be reduced, as in the case of capturing moving images using an electronic zoom. Also, smooth moving images can be achieved by setting the frame rates of two different modes to be the same.

In the above method, the frames read out in the first mode are used as output images. However, when the frames read out in the first mode are resized to have an angle of view equal to that of the images read out in the second mode, the frames read out in the first mode will have less amount of information and a lower resolution than the images read out in the second mode, resulting in poor image quality.

To address this, only frames read out in the second mode are read out at a predetermined frame interval and the frames read out for WB processing while the image sensing unit is driven in the first mode are read out in an interval between the frames read out while the image sensing unit is driven in the second mode. It is also possible to use only frames read out in the second mode to obtain output images. In this case, because the image data of the frames read out in the first mode is not used, deterioration of image quality that might otherwise be caused by using the frames read out in the first mode does not occur. Also, because the frames read out in the second mode are read out at a constant frame interval, smooth moving images can be achieved.

Sixth Embodiment

Figure 24:
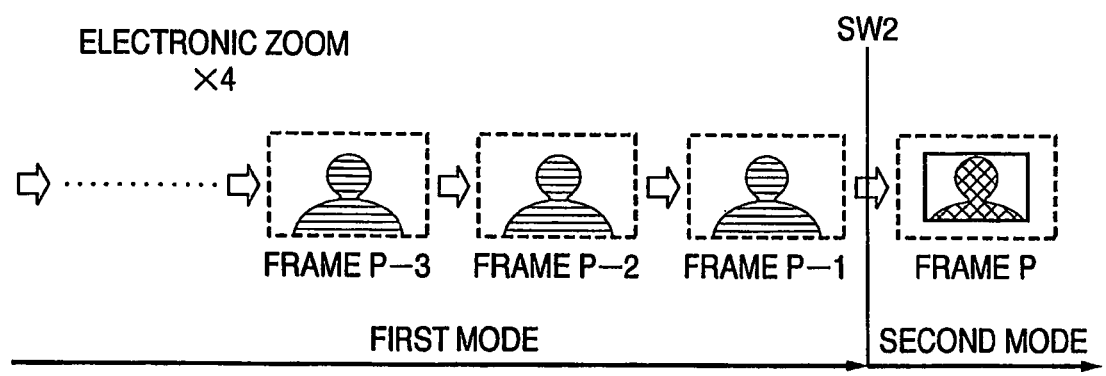
FIG. 24 is a conceptual diagram showing an operation of an image sensing apparatus according to a sixth preferred embodiment of the present invention.

FIG. 24 is a conceptual diagram showing an operation according to a sixth preferred embodiment of the present invention. As an example of this embodiment, an exemplary operation of an image sensing apparatus when used to capture still images at an electronic zoom magnification set to 4 (×4) is shown.

FIG. 24 illustrates successive frames read out from an image sensing apparatus arranged in temporal order from the left to the right, those before SW2 being taken before capturing a still image and the last one presenting the still image. The image sensing unit is driven in the first mode for Frames P−3 to P−1. At SW2, the mode switches to the second mode, and Frame P is read out. In the first mode, the rectangular region 901 of FIG. 23 is read out by reading every two lines in the vertical direction in an image sensing unit 1200. In the second mode, the rectangular region 902 of FIG. 23 is read out in the image sensing unit 1200. The rectangular region 902 is a region extending from the center of the rectangular region 901 up to half in the diagonal direction of the rectangular region 901. The rectangular region 902 is obtained when an electronic zoom magnification of 4 (×4) is applied to the rectangular region 901. The image data of Frames P−3 to P−1 is resized to have an angle of view equal to that of Frame P by cutting out predetermined regions in the captured image signal processing circuit 1506. The generated images are displayed with the display unit 1511. At the same time, based on the image data of Frame P−1, WB processing is performed with the captured image signal processing circuit 1506. Based on the thus-obtained WB coefficients and the image data of Frame P, a still image is generated. In this case, it is preferable to perform APC processing such that the amplification factor of high frequency luminance signal in the APC circuit 604 obtained from Frames P−3 to P−1 has a higher value than that obtained from Frame P (where P is an integer).

As described above, by using the above method, it is possible to perform appropriate WB processing even when the proportion of white is likely to be reduced, as in the case of capturing still images using an electronic zoom.

In the embodiments given above, cases where the present invention is applied to digital cameras are described, but it is to be understood that the application of the present invention is not limited to digital cameras, and applicable also to digital video cameras, cell phones equipped with digital cameras, scanners, etc. The present invention can be applied to cameras that capture images by a remote operation in response to a release command sent from a personal computer connected with a camera in a wired or wireless manner. Further, the scope of the present invention encompasses a case where the program code of software for realizing the functions of the above embodiments is supplied to an element connected to various devices or to a computer in a system. The scope of the present invention also encompasses a case where the various devices are operated according to a program stored in a computer (CPU or MPU) of the system or device.

In this case, the program code of the software realizes the functions of the above-described embodiments. In other words, the program code and a unit adapted to supply the program code to a computer such as a recording medium that stores the program code may constitute the present invention. The recording medium that stores the program codes can be, for example, a flexible disk, hard disk, optical disk, magneto-optical disk, CD-ROM, magnetic tape, nonvolatile memory card, ROM or the like.

The scope of the present invention also encompasses not only a case where the functions of the above-described embodiments are realized by executing the program code supplied to a computer, but also an OS (Operating System) of a computer on which the program code runs. Also, when the functions of the above-described embodiments are realized by program code that works in conjunction with other application software, such program code is also encompassed in the scope of the present invention.

Further, the scope of the present invention encompasses a CPU a CPU included in a function expansion board of a computer or a function expansion unit connected to a computer, the CPU realizing the functions of the above embodiments based on the instructions of the supplied program code stored in a memory provided in the function expansion board or the function expansion unit. The scope of the present invention also encompasses a case where the CPU performs part or all of the actual processing and the functions of the above embodiments are realized by the processing.

Seventh Embodiment

The software configurations and hardware configurations according to the first to sixth embodiments given above are interchangeable. In the present invention, the embodiments given above or their technical features can be combined according to necessity. Also, in the present invention, any one of the claims and all or part of the configurations of the embodiments may be used to form a single device. The present invention may be combined with other devices such as an image sensing apparatus (e.g., a digital camera or video camera) or a signal processing device that processes signals obtained from the image sensing apparatus. Alternatively, the present invention may be an element that constitutes the device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-121271, filed Apr. 25, 2006 and Japanese Patent Application No. 2006-164067 filed Jun. 13, 2006, which are hereby incorporated by reference herein in their entirety.

The invention claimed is:
1. An image sensing apparatus comprising:
an image sensing unit having a first pixel area and a second pixel area which is different from the first pixel area; and
a control unit that controls to, in case of reading image signal from the first pixel area for a plurality of times, read image signal from one of a plurality of divided areas obtained by dividing the second pixel area at a predetermined interval, calculate correction coefficients using the image signal read from the divided area, and apply white balance correction to the image signal read from the first pixel area using the calculated correction coefficients, wherein the control unit changes among the divided areas the divided area from which the image signal is read at different timing of the predetermined interval.

2. The image sensing apparatus according to claim 1, wherein the control unit reads image signal alternately from the first pixel area and one of the divided areas.

3. The image sensing apparatus according to claim 1, wherein the control unit reads image signal from one of the divided areas every M (M is an integer larger than 1) times of reading image signal from the first pixel area.

4. The image sensing apparatus according to claim 1, wherein the control unit calculates the correction coefficients in a case where the size of the total divided areas from which image signals are read exceeds the size of the first pixel area.

5. The image sensing apparatus according to claim 1, wherein the control unit calculates the correction coefficients in a case where the size of the total divided areas from which image signals area read is equal to the size of the first pixel area.

6. The image sensing apparatus according to claim 1, wherein the control unit calculates the correction coefficients each time image signals is read from one of the divided areas.

7. A control method of controlling the image sensing apparatus including an image sensing unit having a first pixel area and a second pixels area which is different from the first pixel area, the method comprising:

in case of reading image signal from the first pixel area for a plurality of times, reading image signal from one of a plurality of divided areas obtained by dividing the second pixel area at a predetermined interval;

calculating correction coefficients using the image signal read from the divided area; and applying white balance correction to the image signal read from the first pixel area using the calculated correction coefficients, wherein the divided areas, among the divided areas, from which the image signal is read is changed at different timing of the predetermined interval.

* * * * *